US012431757B2

(12) United States Patent
Ichioka et al.

(10) Patent No.: US 12,431,757 B2
(45) Date of Patent: Sep. 30, 2025

(54) ELECTRIC WORK MACHINE WITH STATOR HAVING INSULATOR WITH FIRST COVER AND RIBS SUPPORTING WIRE

(71) Applicant: MAKITA CORPORATION, Anjo (JP)

(72) Inventors: Yusuke Ichioka, Anjo (JP); Junya Inuzuka, Anjo (JP)

(73) Assignee: MAKITA CORPORATION, Anjo (JP)

( * ) Notice: Subject to any disclaimer, the term of this patent is extended or adjusted under 35 U.S.C. 154(b) by 666 days.

(21) Appl. No.: 17/747,196

(22) Filed: May 18, 2022

(65) Prior Publication Data

US 2022/0416608 A1    Dec. 29, 2022

(30) Foreign Application Priority Data

Jun. 29, 2021    (JP) ................................. 2021-108003

(51) Int. Cl.
| | | |
|---|---|---|
| *H02K 3/52* | (2006.01) | |
| *A01D 34/68* | (2006.01) | |
| *A01D 34/78* | (2006.01) | |
| *H02K 21/22* | (2006.01) | |
| *A01D 101/00* | (2006.01) | |

(52) U.S. Cl.
CPC ......... *H02K 3/522* (2013.01); *A01D 34/6806* (2013.01); *A01D 34/78* (2013.01); *H02K 21/22* (2013.01); *A01D 2101/00* (2013.01); *H02K 2203/12* (2013.01)

(58) Field of Classification Search
CPC ............... H02K 15/0012; H02K 15/10; H02K 2213/12; H02K 3/30; H02K 3/32; H02K 3/34; H02K 3/345; H02K 3/522; H02K 1/148; H02K 1/185; H02K 1/278; H02K 21/16
USPC .......................................................... 310/71
See application file for complete search history.

(56) References Cited

U.S. PATENT DOCUMENTS

| | | | | | |
|---|---|---|---|---|---|
| 3,339,097 | A | * | 8/1967 | Dunn ...................... | H02K 3/522 |
| | | | | | 310/194 |
| 6,509,665 | B1 | * | 1/2003 | Nishiyama ............. | H02K 9/223 |
| | | | | | 310/194 |
| 6,566,779 | B2 | * | 5/2003 | Takano .................. | H02K 3/522 |
| | | | | | 310/194 |

(Continued)

FOREIGN PATENT DOCUMENTS

| | | |
|---|---|---|
| CN | 107979254 A | 5/2018 |
| DE | 10 2016 205 648 A1 | 10/2017 |

(Continued)

*Primary Examiner* — Maged M Almawri
(74) *Attorney, Agent, or Firm* — Oliff PLC

(57) ABSTRACT

An electric work machine includes coils formed reliably. The machine includes a stator, a rotor rotatable about a rotation axis, and an output unit drivable by the rotor. The stator includes a stator core including a cylindrical yoke and teeth protruding radially outward from the yoke, an insulator fixed to the stator core, and coils each wound around a corresponding one of the teeth with the insulator in between. The insulator includes a first cover covering a first end face of the yoke in a first axial direction and a rib on the first cover and supporting a wire connecting the coils. The rotor includes a rotor core outside a periphery of the stator and a magnet fixed to the rotor core.

17 Claims, 32 Drawing Sheets

(56) References Cited

U.S. PATENT DOCUMENTS

| | | |
|---|---|---|
| 6,790,134 B2 | 9/2004 | Swaddle et al. |
| 7,038,343 B2 | 5/2006 | Agnes et al. |
| 7,083,508 B2 | 8/2006 | Swaddle |
| 7,382,075 B2* | 6/2008 | Wang ............ H02K 3/522 310/260 |
| 8,754,562 B2* | 6/2014 | Platon ............ H02K 3/44 310/215 |
| 9,577,493 B2 | 2/2017 | Ekstrom et al. |
| 9,937,570 B2 | 4/2018 | Chen et al. |
| 10,193,417 B2 | 1/2019 | Fogle et al. |
| 10,424,998 B2 | 9/2019 | Keil et al. |
| 10,840,780 B2* | 11/2020 | Kim ............ H02K 13/10 |
| 11,286,956 B2* | 3/2022 | Kajikawa ............ H02K 7/14 |
| 11,456,637 B2* | 9/2022 | Sakauchi ............ H02K 1/146 |
| 2003/0098630 A1* | 5/2003 | Owada ............ H02K 3/24 310/194 |
| 2005/0012413 A1* | 1/2005 | Bott ............ H02K 3/522 310/71 |
| 2005/0044692 A1* | 3/2005 | Takano ............ H02K 15/095 29/605 |
| 2007/0222324 A1* | 9/2007 | Fukui ............ H02K 9/223 310/260 |
| 2009/0189474 A1* | 7/2009 | van Heyden ............ H02K 3/522 310/195 |
| 2010/0013336 A1 | 1/2010 | Ortt et al. |
| 2010/0188181 A1* | 7/2010 | Urano ............ H02K 3/522 336/198 |
| 2010/0213784 A1* | 8/2010 | Iizuka ............ H02K 1/148 29/596 |
| 2010/0275436 A1* | 11/2010 | Kiyono ............ H02K 15/12 29/596 |
| 2012/0098380 A1* | 4/2012 | Wang ............ H02K 15/0431 310/260 |
| 2012/0286619 A1* | 11/2012 | Tsuiki ............ H02K 3/522 310/215 |
| 2013/0020885 A1* | 1/2013 | Hsieh ............ H02K 5/08 310/43 |
| 2013/0193800 A1* | 8/2013 | Yokogawa ............ H02K 3/522 310/215 |
| 2016/0141932 A1 | 5/2016 | Aoyama et al. |
| 2017/0077773 A1 | 3/2017 | Li et al. |
| 2019/0319500 A1* | 10/2019 | Shinohara ............ H02K 15/022 |
| 2020/0161927 A1 | 5/2020 | Marjomaa et al. |
| 2020/0343789 A1 | 10/2020 | Fogle et al. |
| 2021/0099033 A1* | 4/2021 | Shinohara ............ H02K 21/16 |

FOREIGN PATENT DOCUMENTS

| | | |
|---|---|---|
| EP | 1 641 104 A2 | 3/2006 |
| EP | 2 214 296 A1 | 8/2010 |
| JP | 2016-093132 A | 5/2016 |
| WO | 2015/050484 A1 | 4/2015 |
| WO | 2017/097520 A1 | 6/2017 |
| WO | 2017/097539 A1 | 6/2017 |

* cited by examiner

FIG. 28

| DRIVING PATTERN | Dp1 | Dp2 | Dp3 | Dp4 | Dp5 | Dp6 |
|---|---|---|---|---|---|---|
| QHu | OFF | OFF | OFF | ON | ON | OFF |
| QHv | ON | OFF | OFF | OFF | OFF | ON |
| QHw | OFF | ON | ON | OFF | OFF | OFF |
| QLu | ON | ON | OFF | OFF | OFF | OFF |
| QLv | OFF | OFF | ON | ON | OFF | OFF |
| QLw | OFF | OFF | OFF | OFF | ON | ON |

→ TIME

ELECTRIC WORK MACHINE WITH STATOR HAVING INSULATOR WITH FIRST COVER AND RIBS SUPPORTING WIRE

CROSS-REFERENCE TO RELATED APPLICATIONS

This application claims the benefit of priority to Japanese Patent Application No. 2021-108003, filed on Jun. 29, 2021, the entire contents of which are hereby incorporated by reference.

BACKGROUND

1. Technical Field

The present disclosure relates to an electric work machine.

2. Description of the Background

In the field of electric work machines, an electric work machine is known as described in, for example, Japanese Unexamined Patent Application Publication No. 2016-093132.

BRIEF SUMMARY

A motor includes a stator with coils and a rotor with magnets. The coils are formed by winding a wire. A technique for forming coils in a reliable manner is awaited.

One or more aspects of the present disclosure are directed to an electric work machine including coils formed in a reliable manner.

A first aspect of the present disclosure provides an electric work machine, including:
a stator including
a stator core including a yoke being cylindrical and a plurality of teeth protruding radially outward from the yoke,
an insulator fixed to the stator core, and
a plurality of coils each being wound around a corresponding tooth of the plurality of teeth with the insulator in between, the insulator including
a first cover covering a first end face of the yoke in a first axial direction, and
a rib on the first cover, the rib supporting a wire connecting the plurality of coils;
a rotor rotatable about a rotation axis, the rotor including
a rotor core located outside a periphery of the stator, and
a magnet fixed to the rotor core; and
an output unit drivable by the rotor.

A second aspect of the present disclosure provides an electric work machine, including:
a stator including
a stator core including a yoke being annular and a plurality of teeth protruding radially outward from the yoke,
an insulator fixed to the stator core, and
a plurality of coils each being wound around a corresponding tooth of the plurality of teeth with the insulator in between, the insulator including
a first cover covering a first end face of the yoke in a first axial direction, and
a protrusion on the first cover;
a rotor rotatable about a rotation axis, the rotor including
a rotor core located outside a periphery of the stator, and
a magnet fixed to the rotor core;
an output unit drivable by the rotor;
a first portion of a wire located on the first cover and connecting a first coil and a second coil of the plurality of coils; and
a second portion of the wire located on the first cover and connecting a third coil and a fourth coil of the plurality of coils, the second portion of the wire at least partially overlapping the first portion of the wire, the second portion of the wire being supported by the protrusion.

The electric work machine according to the above aspects of the present disclosure includes coils formed in a reliable manner.

BRIEF DESCRIPTION OF DRAWINGS

FIG. 28 is a table showing driving patterns for switching elements in the embodiment.

DETAILED DESCRIPTION

Although one or more embodiments will now be described with reference to the drawings, the present disclosure is not limited to the embodiments described below. The components in the embodiments described below may be combined as appropriate. One or more components may be eliminated.

In the embodiments, the positional relationships between the components will be described using the directional terms such as right and left (or lateral), front and rear, and up and down (or vertical). The terms indicate relative positions or directions with respect to the center of an electric work machine.

The electric work machine includes a motor. In the embodiments, a direction radial from a rotation axis AX of the motor is referred to as a radial direction or radially for convenience. A direction parallel to the rotation axis AX of the motor is referred to as an axial direction for convenience. A direction about the rotation axis AX of the motor is referred to as a circumferential direction, circumferentially, or a rotation direction for convenience.

A position nearer the rotation axis AX of the motor in the radial direction, or a radial direction toward the rotation axis AX, is referred to as being radially inward for convenience. A position farther from the rotation axis AX of the motor in the radial direction, or a radial direction away from the rotation axis AX, is referred to as being radially outward for convenience.

A position in one axial direction, or one axial direction, is referred to as a first axial direction for convenience. A position in the other axial direction, or the other axial direction, is referred to as a second axial direction for convenience. In the embodiments, the axial direction is the vertical direction. When the first axial direction is an upward direction, the second axial direction is a downward direction. When the first axial direction is a downward direction, the second axial direction is an upper direction.

A position in one circumferential direction, or one circumferential direction, is referred to as a first circumferential direction for convenience. A position in the other circumferential direction, or the other circumferential direction, is referred to as a second circumferential direction for convenience.

Electric Work Machine

Figure 1:
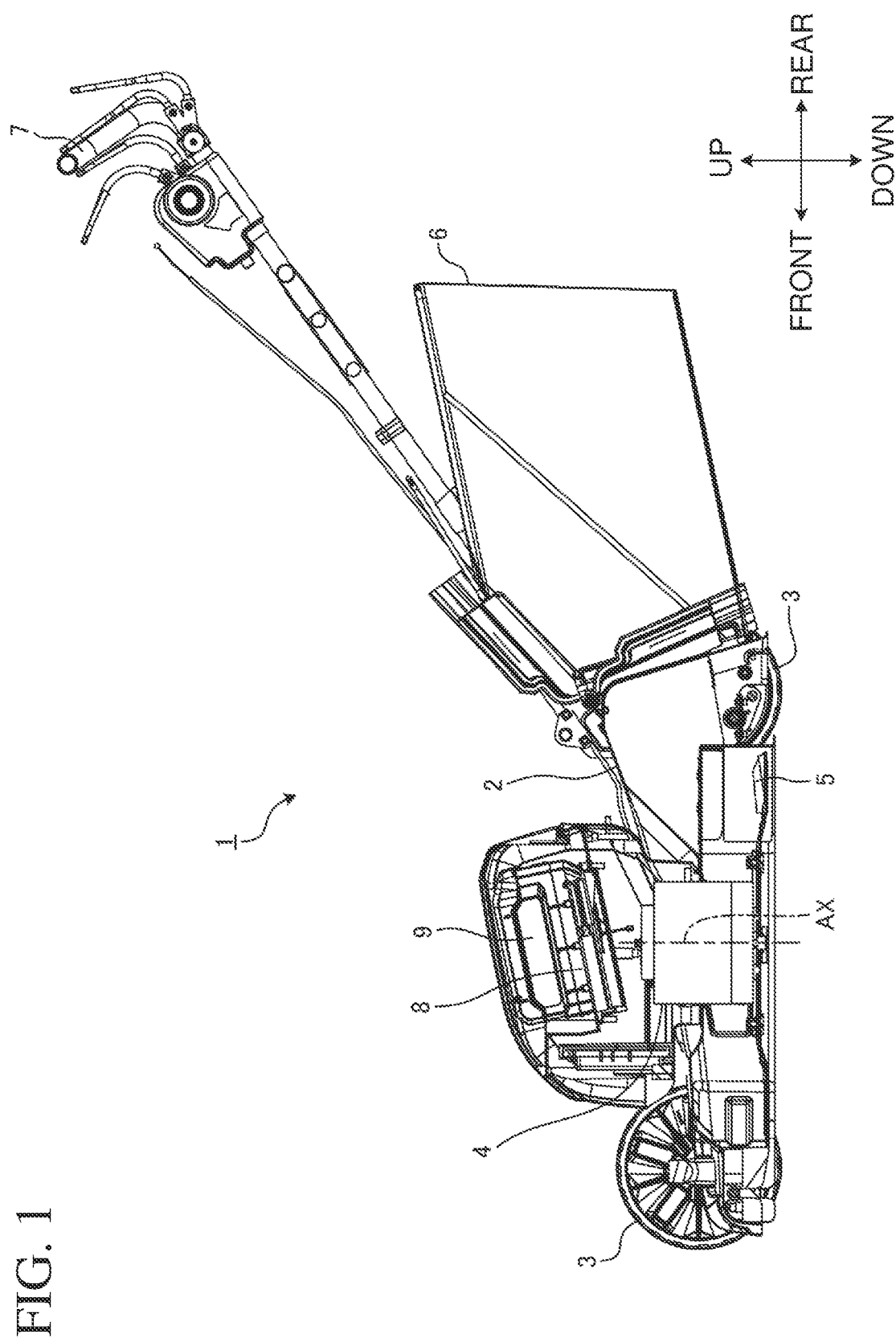
FIG. 1 is a diagram of an electric work machine according to an embodiment.

FIG. 1 is a diagram of an electric work machine 1 according to an embodiment. The electric work machine 1 according to the present embodiment is a lawn mower, which is an example of outdoor power equipment.

As shown in FIG. 1, the electric work machine 1 includes a housing 2, wheels 3, a motor 4, a cutting blade 5, a grass box 6, a handle 7, and a battery mount 8.

The housing 2 accommodates the motor 4 and the cutting blade 5. The housing 2 supports the wheels 3, the motor 4, and the cutting blade 5.

The wheels 3 rotate on the ground. Thus, the electric work machine 1 moves on the ground. The electric work machine 1 includes four wheels 3.

The motor 4 is a power source for the electric work machine 1. The motor 4 generates a rotational force for rotating the cutting blade 5. The motor 4 is located above the cutting blade 5.

The cutting blade 5 is connected to the motor 4. The cutting blade 5 is an output unit in the electric work machine 1 that is drivable by the motor 4. The cutting blade 5 is rotatable about the rotation axis AX of the motor 4 under the rotational force generated by the motor 4. The cutting blade 5 faces the ground. The cutting blade 5, with the wheels 3 in contact with the ground, rotates while mowing grass on the ground. The grass mown by the cutting blade 5 is collected in the grass box 6.

A user holds the handle 7 of the electric work machine 1 with his or her hand. The user holding the handle 7 can move the electric work machine 1.

The battery mount 8 receives a battery pack 9. The battery pack 9 supplies power to the electric work machine 1. The battery pack 9 is detachable from the battery mount 8. The battery pack 9 includes a secondary battery. The battery pack 9 in the present embodiment includes a rechargeable lithium-ion battery. The battery pack 9 is attached to the battery mount 8 to power the electric work machine 1. The battery pack 9 provides a driving current to drive the motor 4.

Motor

Figure 2:
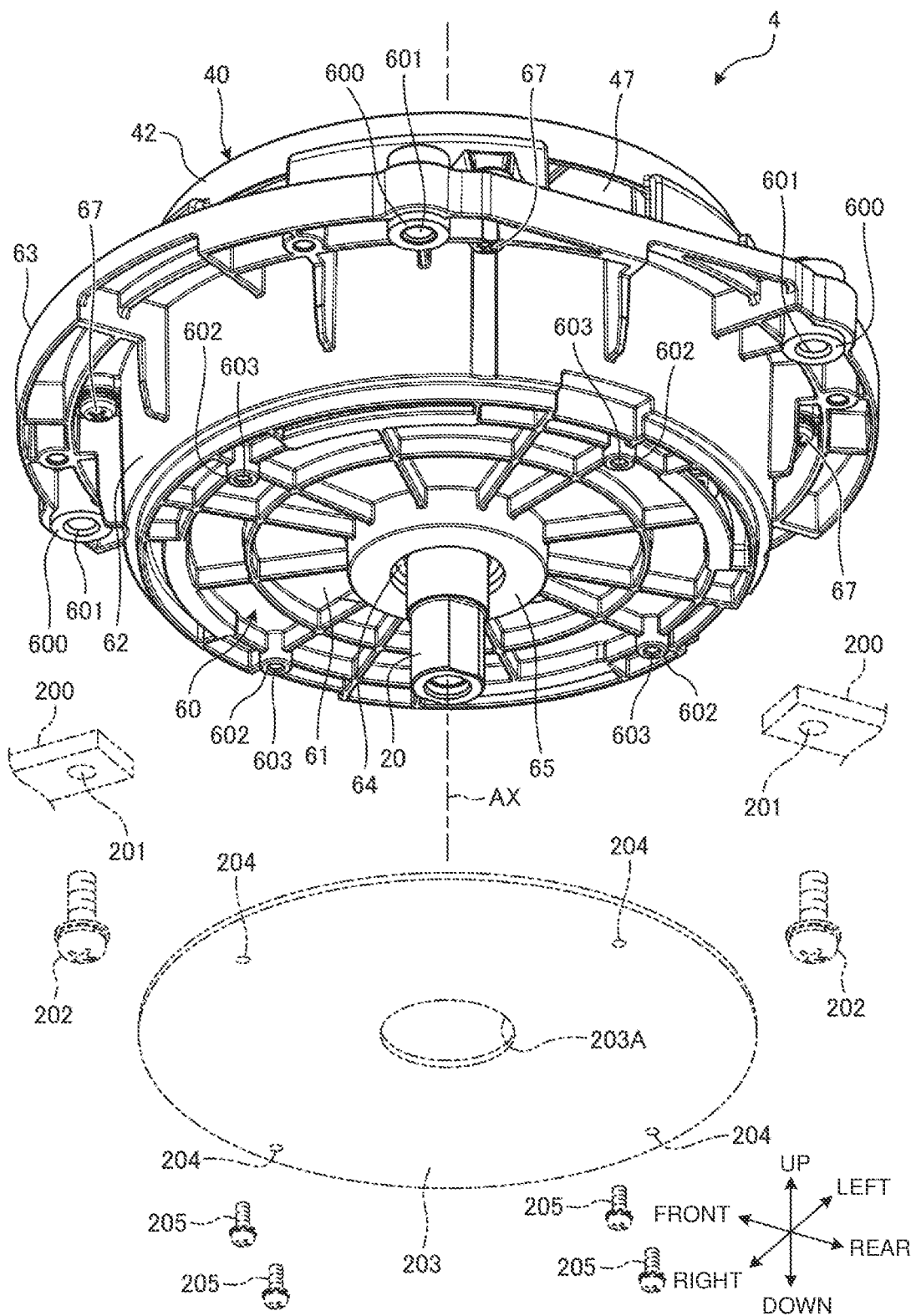
FIG. 2 is a perspective view of a motor in the embodiment as viewed from below.
Figure 3:
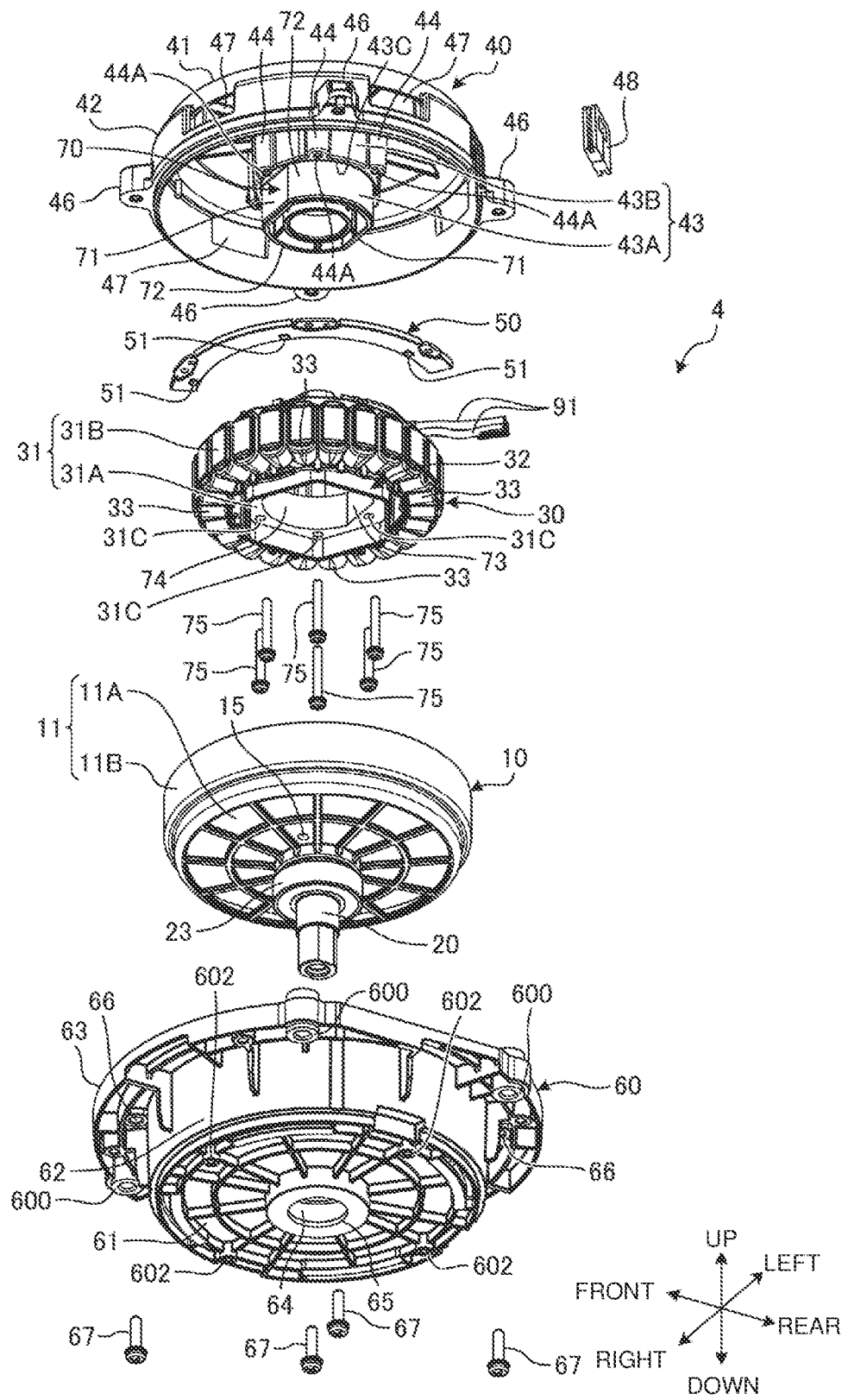
FIG. 3 is an exploded perspective view of the motor in the embodiment as viewed from below.
Figure 4:
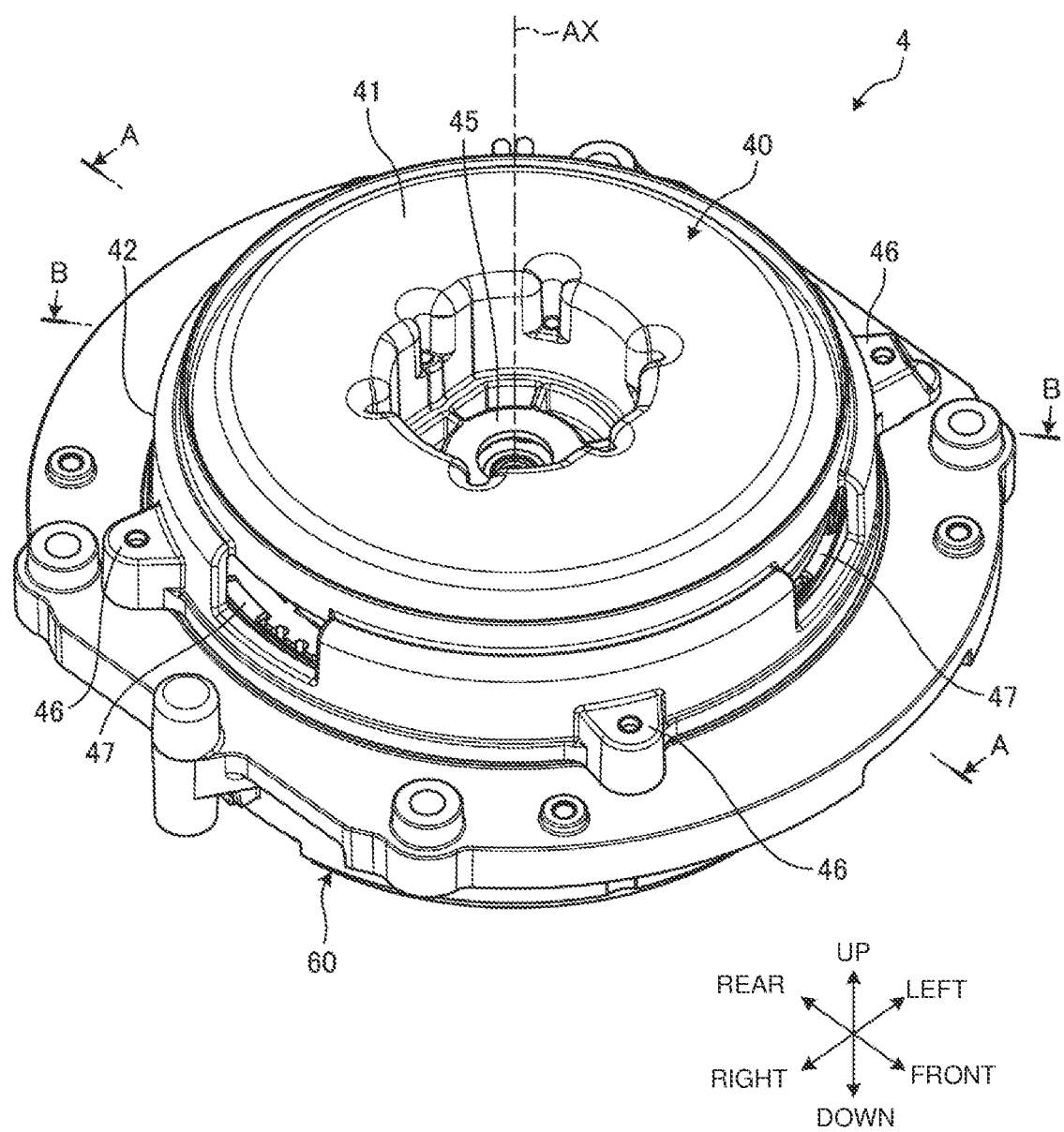
FIG. 4 is a perspective view of the motor in the embodiment as viewed from above.
Figure 5:
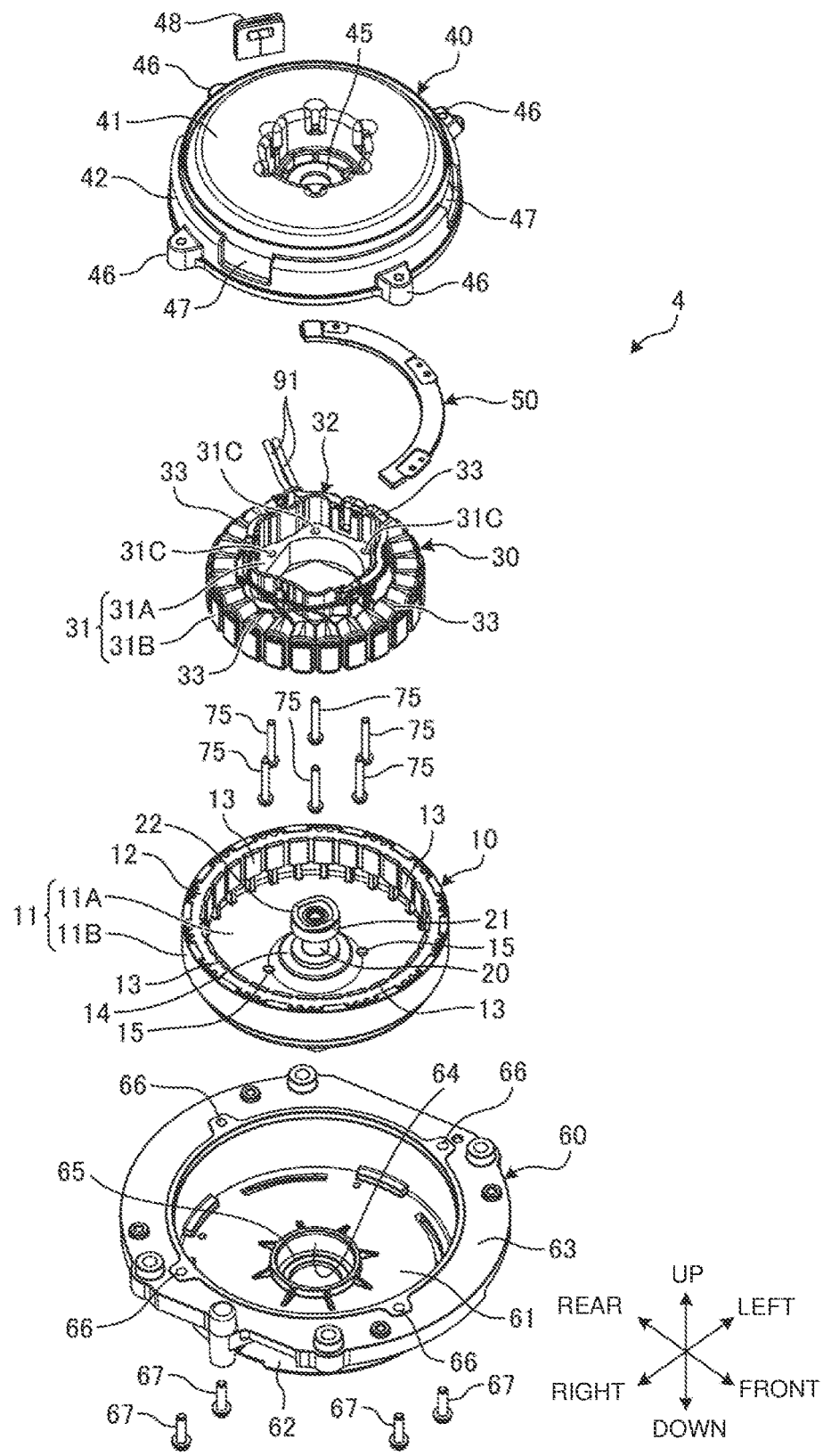
FIG. 5 is an exploded perspective view of the motor in the embodiment as viewed from above.
Figure 6:
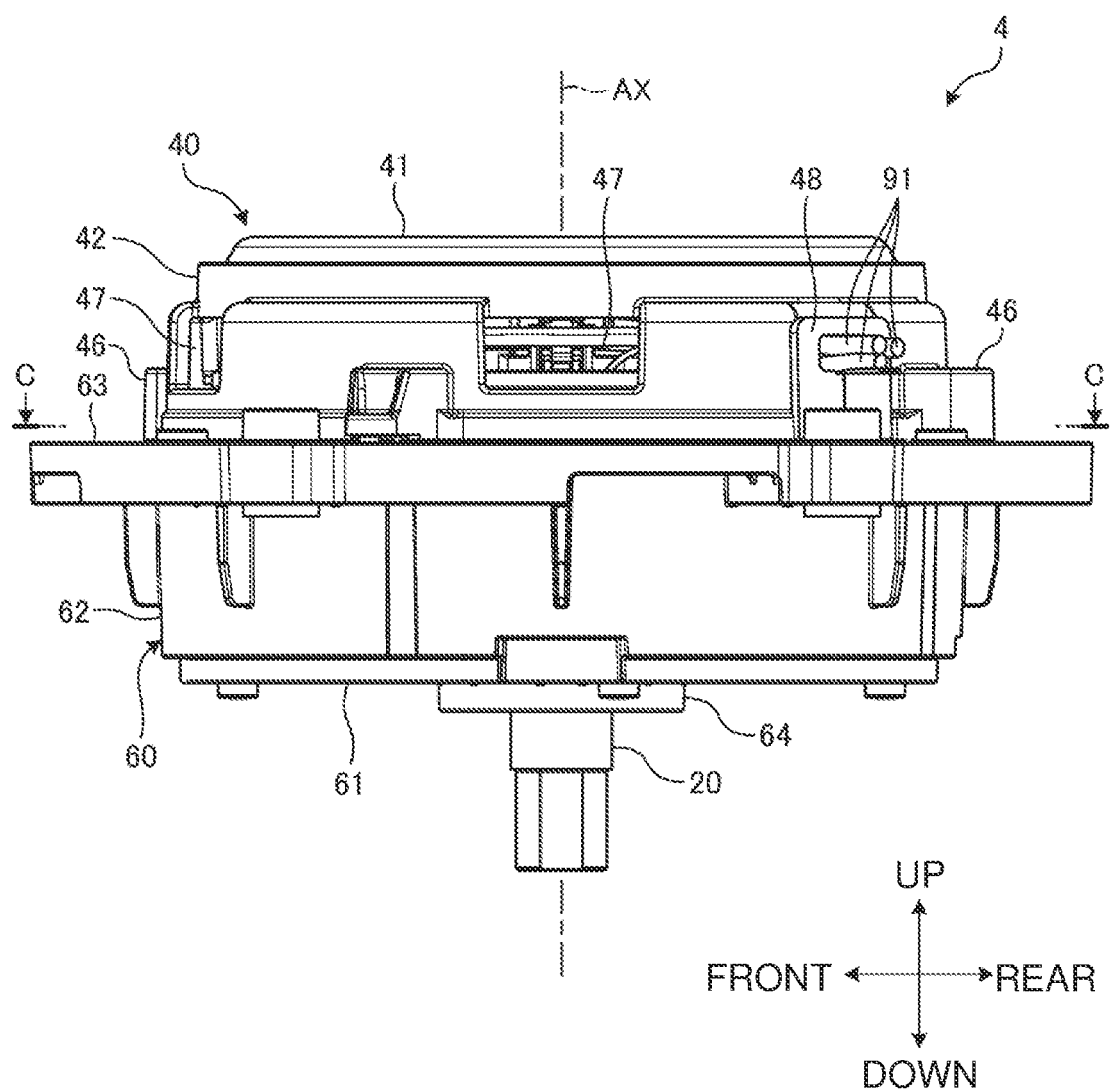
FIG. 6 is a front view of the motor in the embodiment.
Figure 7:
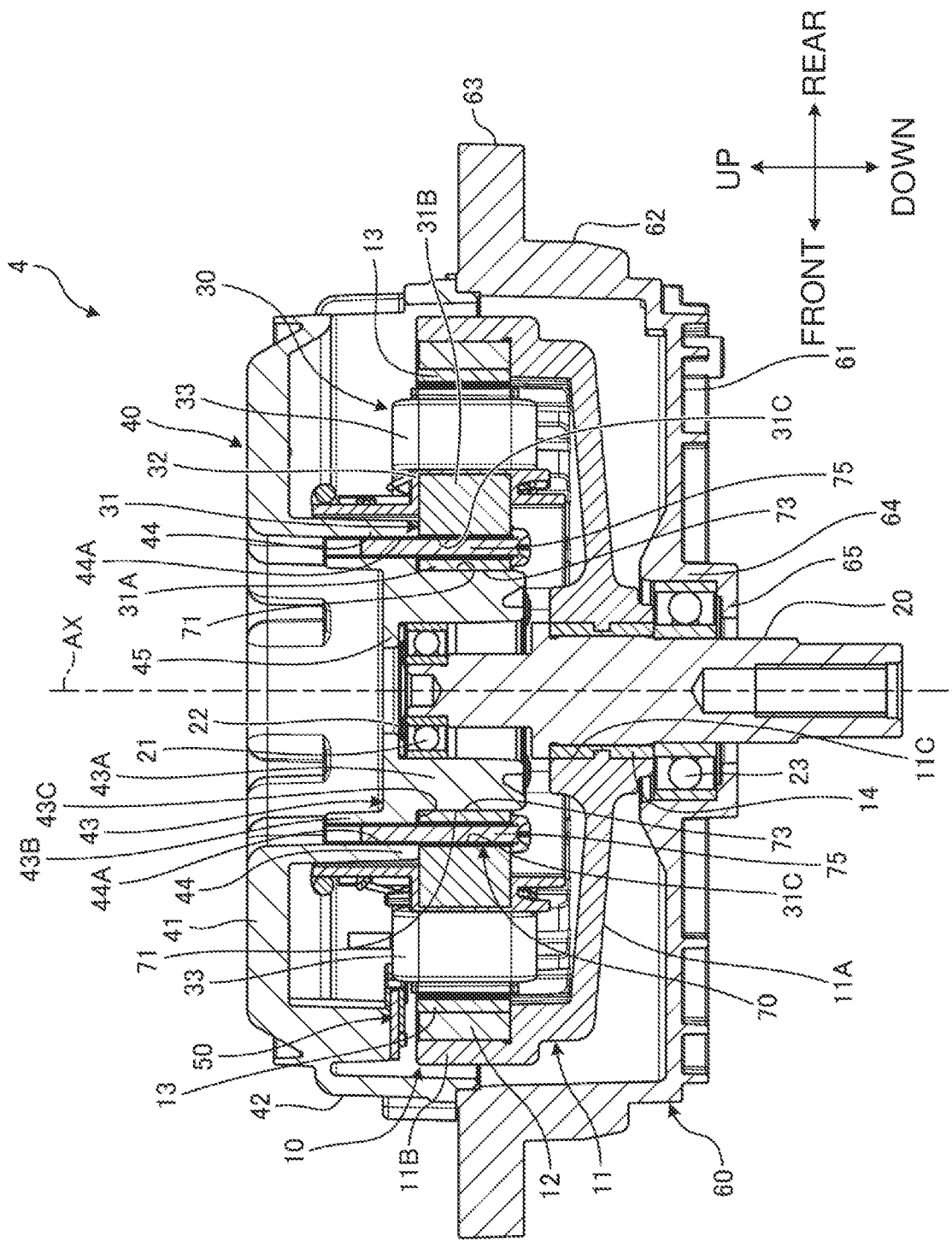
FIG. 7 is a longitudinal cross-sectional view of the motor in the embodiment.
Figure 8:
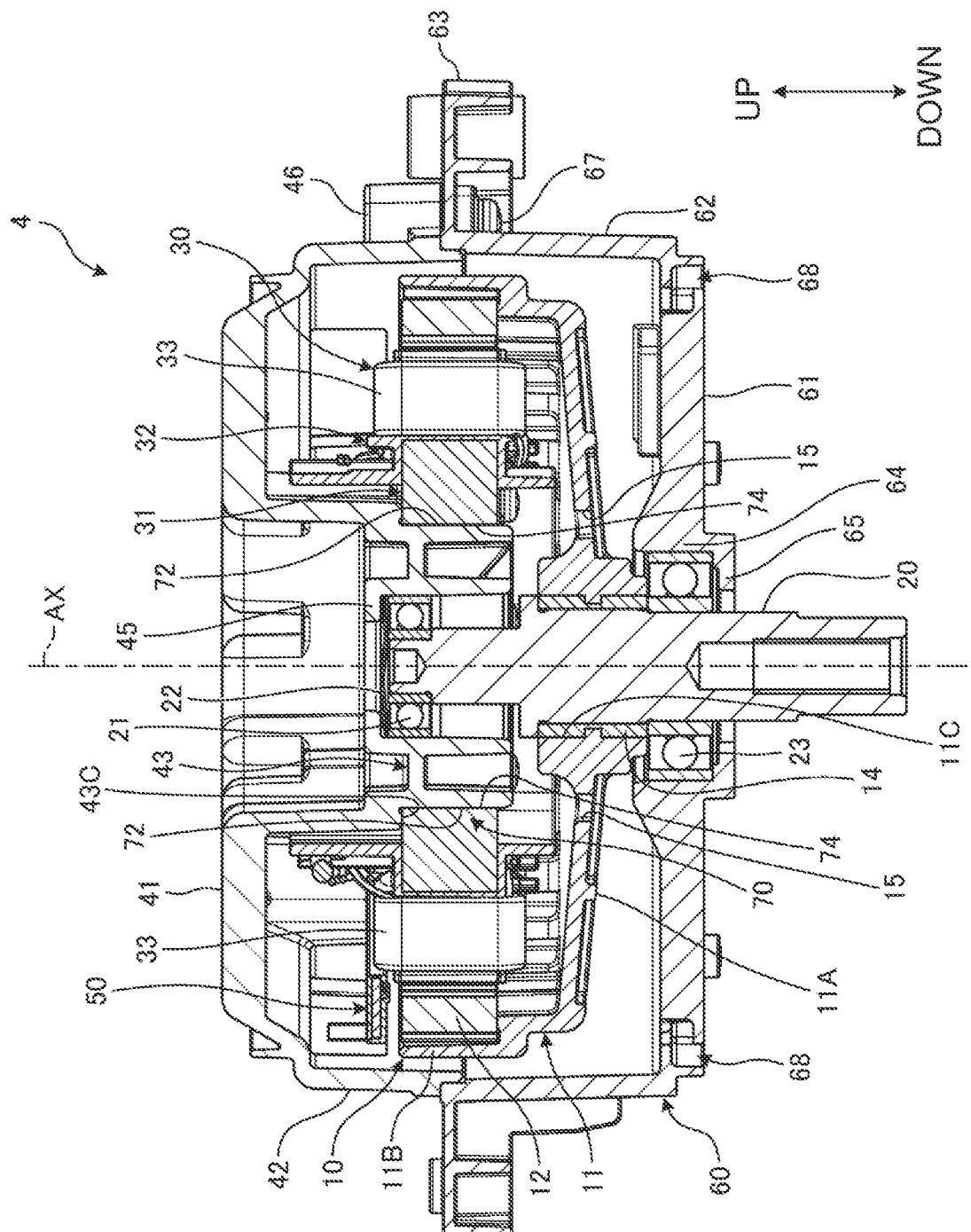
FIG. 8 is a longitudinal cross-sectional view of the motor in the embodiment.
Figure 9:
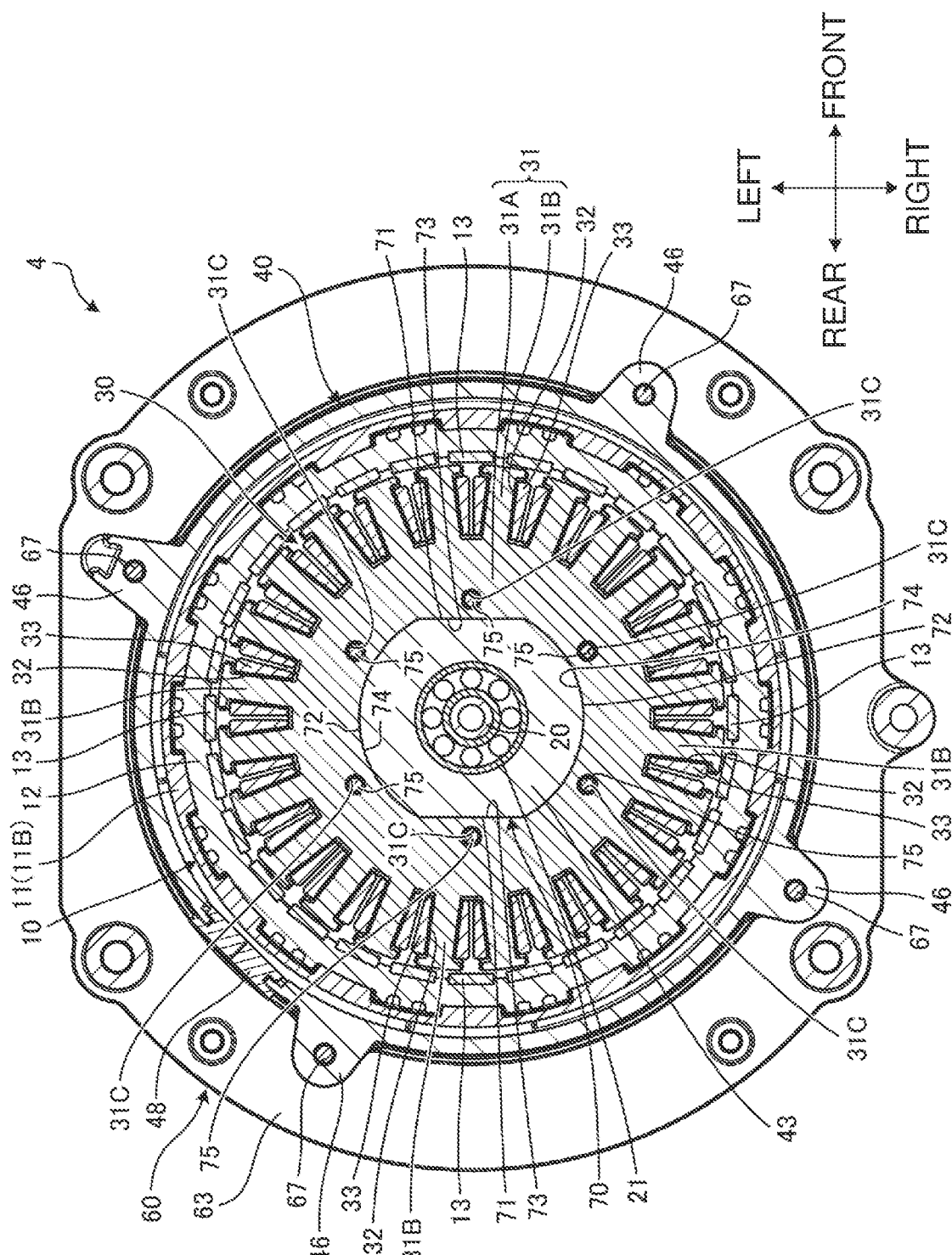
FIG. 9 is a cross-sectional view of the motor in the embodiment.

FIG. 2 is a perspective view of the motor 4 in the embodiment as viewed from below. FIG. 3 is an exploded perspective view of the motor 4 in the embodiment as viewed from below. FIG. 4 is a perspective view of the motor 4 in the embodiment as viewed from above. FIG. 5 is an exploded perspective view of the motor 4 in the embodiment as viewed from above. FIG. 6 is a front view of the motor 4 in the embodiment. FIG. 7 is a longitudinal cross-sectional view of the motor 4 in the embodiment. FIG. 7 is a cross-sectional view taken along line A-A in FIG. 4 as viewed in the direction indicated by arrows. FIG. 8 is a longitudinal cross-sectional view of the motor 4 in the embodiment. FIG. 8 is a cross-sectional view taken along line B-B in FIG. 4 as viewed in the direction indicated by arrows. FIG. 9 is a cross-sectional view of the motor 4 in the embodiment. FIG. 9 is a cross-sectional view taken along line C-C in FIG. 6 as viewed in the direction indicated by arrows. The motor 4 in the embodiment is an outer-rotor brushless motor.

As shown in FIGS. 2 to 9, the motor 4 includes a rotor 10, a rotor shaft 20, a stator 30, a stator base 40, a sensor board 50, and a motor housing 60. The rotor 10 rotates relative to the stator 30. The rotor 10 at least partially surrounds the stator 30. The rotor 10 is located outside the periphery of the stator 30. The rotor shaft 20 is fixed to the rotor 10. The rotor 10 and the rotor shaft 20 rotate about the rotation axis AX. The stator base 40 supports the stator 30. The cutting blade 5 is connected to the rotor shaft 20. The cutting blade 5 is drivable by the rotor 10. The sensor board 50 supports magnetic sensors for detecting rotation of the rotor 10.

The motor 4 in the embodiment has the rotation axis AX extending vertically. The axial direction and the vertical direction are parallel to each other.

The rotor 10 includes a rotor cup 11, a rotor core 12, and magnets 13.

The rotor cup 11 is formed from an aluminum-based metal. The rotor cup 11 includes a plate 11A and a yoke 11B.

The plate 11A is substantially annular. The plate 11A surrounds the rotation axis AX. The plate 11A has the central axis aligned with the rotation axis AX. The plate 11A has an opening 11C in its center. The rotor shaft 20 is at least partially located in the opening 11C. In the embodiment, a bush 14 is located between the outer surface of the rotor shaft 20 and the inner surface of the opening 11C.

The yoke 11B is substantially cylindrical. The yoke 11B has a lower end connected to the periphery of the plate 11A. The plate 11A is integral with the yoke 11B. The yoke 11B extends upward from the periphery of the plate 11A. The yoke 11B surrounds the stator 30. The yoke 11B surrounds the rotation axis AX. The yoke 11B has the central axis aligned with the rotation axis AX.

The rotor core 12 includes multiple steel plates stacked in the axial direction. The rotor core 12 is substantially cylindrical. The rotor core 12 is supported by the rotor cup 11. The rotor cup 11 at least partially surrounds the rotor core 12. The rotor core 12 is located radially inside the yoke 11B. The rotor core 12 is surrounded by the yoke 11B. The rotor core 12 is supported on the inner circumferential surface of the yoke 11B.

The magnets 13 are permanent magnet plates. The magnets 13 are sintered plate magnets. The magnets 13 are fixed to the rotor core 12. The magnets 13 are located radially inside the rotor core 12. The magnets 13 are fixed to the inner circumferential surface of the rotor core 12. The magnets 13 in the embodiment are fixed to the inner circumferential surface of the rotor core 12 with an adhesive. The multiple (28 in the embodiment) magnets 13 are arranged at circumferentially equal intervals with their N poles and S poles located alternately in the circumferential direction.

The rotor shaft 20 extends in the axial direction. The rotor shaft 20 is fixed to the rotor 10. The rotor 10 includes a lower portion received inside the opening 11C in the plate 11A. The rotor shaft 20 is fastened to the plate 11A with the bush 14. The upper end of the rotor shaft 20 is located above the upper surface of the plate 11A. The lower end of the rotor shaft 20 is located below the lower surface of the plate 11A.

The rotor shaft 20 has the central axis aligned with the rotation axis AX. The rotor shaft is fixed to the rotor 10 to align the central axis of the rotor shaft 20 with the central axis of the yoke 11B.

The stator 30 includes a stator core 31, an insulator 32, and coils 33.

The stator core 31 includes multiple steel plates stacked in the axial direction. The stator core 31 includes a yoke 31A and teeth 31B. The yoke 31A is cylindrical. The yoke 31A surrounds the rotation axis AX. The yoke 31A has an outer circumferential surface with the central axis aligned with the rotation axis AX. Each tooth 31B protrudes radially outward from the outer circumferential surface of the yoke 31A. Multiple (24 in the embodiment) teeth 31B are located circumferentially at intervals. The teeth 31B adjacent to each other have a slot between them.

The insulator 32 is formed from a synthetic resin. The insulator 32 is fixed to the stator core 31. The insulator 32 at least partially covers the surface of the stator core 31. The insulator 32 at least partially covers end faces of the yoke 31A facing in the axial direction. The end faces of the yoke 31A include an upper end face facing upward and a lower end face facing downward. The insulator 32 at least partially covers the outer surface of the yoke 31A facing radially outward. The insulator 32 at least partially covers the surfaces of the teeth 31B.

The stator core 31 and the insulator 32 in the embodiment are integral with each other. The insulator 32 is fixed to the stator core 31 by insert molding. The stator core 31 accommodated in a die receives injection of a heat-melted synthetic resin. The synthetic resin then solidifies to form the insulator 32 fixed to the stator core 31.

The coils 33 are attached to the insulator 32. Each coil 33 is wound around each of the teeth 31B with the insulator 32 in between. The insulator 32 covers the surfaces of the teeth 31B around which the coils 33 are wound. The insulator 32 does not cover the outer surface of each tooth 31B that faces radially outward. The stator core 31 and the coil 33 are insulated from each other by the insulator 32. The stator 30 includes multiple (24 in the embodiment) coils 33 arranged circumferentially.

The stator base 40 supports the stator core 31. The stator base 40 is fixed to the stator core 31. The stator base 40 is formed from aluminum. The stator base 40 includes a plate 41, a peripheral wall 42, and a pipe 43.

The plate 41 is substantially annular. The plate 41 surrounds the rotation axis AX. The plate 41 is located above the stator 30.

The peripheral wall 42 is substantially cylindrical. The peripheral wall 42 includes the upper end connected to the periphery of the plate 41. The plate 41 and the peripheral wall 42 are integral with each other. The peripheral wall 42 extends downward from the periphery of the plate 41. The peripheral wall 42 surrounds the yoke 11B in the rotor cup 11.

The pipe 43 is substantially cylindrical. The pipe 43 protrudes downward from a center portion of the lower surface of the plate 41. The pipe 43 surrounds the rotation axis AX. The pipe 43 has the central axis aligned with the rotation axis AX.

The pipe 43 is located at least partially inside the stator core 31. The pipe 43 has the central axis aligned with the central axis of the yoke 31A.

The pipe 43 in the embodiment includes a smaller-diameter portion 43A and a larger-diameter portion 43B. The larger-diameter portion 43B is located upward from the smaller-diameter portion 43A. The smaller-diameter portion 43A and the larger-diameter portion 43B are both cylindrical. The larger-diameter portion 43B has a larger outer diameter than the smaller-diameter portion 43A.

The stator core 31 surrounds the smaller-diameter portion 43A. The larger-diameter portion 43B is located outside the stator core 31. The larger-diameter portion 43B is located above the stator core 31. The stator core 31 is fixed to the pipe 43. The stator base 40 is fixed to the stator 30 with the central axis of the pipe 43 aligned with the central axis of the yoke 31A.

The motor 4 includes a motor positioner 70 for positioning the stator base 40 and the stator 30. The stator base 40 and the stator core 31 are positioned with the motor positioner 70.

The smaller-diameter portion 43A in the embodiment has the outer surface including at least two positions located circumferentially each including a base flat area 71. In the embodiment, one base flat area 71 is located in front of the rotation axis AX, and the other base flat area 71 is located behind the rotation axis AX. The two base flat areas 71 are substantially parallel to each other. The smaller-diameter portion 43A has the outer surface including base curved areas 72. One base curved area 72 is located on the left of the rotation axis AX, and the other base curved area 72 is located on the right of the rotation axis AX.

The yoke 31A in the stator core 31 has an inner surface including stator flat areas 73 and stator curved areas 74. The stator flat areas 73 are in contact with the base flat areas 71. The stator curved areas 74 are in contact with the base curved areas 72.

The motor positioner 70 includes the base flat areas 71 and the stator flat areas 73. The stator flat areas 73 are in contact with the base flat areas 71. The motor positioner 70 includes the base curved areas 72 and the stator curved areas 74. The stator curved areas 74 are in contact with the base curved areas 72.

The base flat areas 71 in contact with the stator flat areas 73 allow the stator base 40 and the stator core 31 to be positioned relative to each other both circumferentially and radially. The base curved areas 72 in contact with the stator curved areas 74 allow the stator base 40 and the stator core 31 to be positioned relative to each other both circumferentially and radially.

The pipe 43 has a base support surface 43C including the boundary between the smaller-diameter portion 43A and the larger-diameter portion 43B. The base support surface 43C faces downward. The base support surface 43C surrounds the smaller-diameter portion 43A.

The base support surface 43C is in contact with the upper end face of the yoke 31A in the stator core 31.

The motor positioner 70 has the base support surface 43C. The base support surface 43C on the pipe 43 in contact with the upper end face of the yoke 31A allows the stator base 40 and the stator core 31 to be positioned relative to each other in the axial direction.

The stator core 31 and the stator base 40 in the embodiment are fastened together with screws 75. The yoke 31A in the stator core 31 has core threaded openings 31C. Each core threaded opening 31C has a through-hole extending from the upper end face to the lower end face of the yoke 31A. Multiple core threaded openings 31C surround the rotation axis AX at intervals.

Screw bosses 44 surround the pipe 43. The screw bosses 44 surround the larger-diameter portion 43B. Each screw boss 44 has a base threaded hole 44A. Multiple screw bosses 44 surround the larger-diameter portion 43B at intervals. In other words, multiple base threaded holes 44A surround the rotation axis AX at intervals.

At least six (six in the embodiment) core threaded openings 31C and at least six (six in the embodiment) base threaded holes 44A are located. The multiple core threaded openings 31C and the multiple base threaded holes 44A surround the rotation axis AX at equal intervals.

The stator core 31 and the stator base 40 in the embodiment are fastened together with six screws 75. The screws 75 are placed into the corresponding core threaded openings 31C from below the stator core 31. Each screw 75 placed through the corresponding core threaded opening 31C has the distal end to be received in the corresponding base threaded hole 44A in the screw boss 44. Threads on the screws 75 are engaged with threaded grooves on the base threaded holes 44A to fasten the stator core 31 and the stator base 40 together.

The motor positioner 70 includes the screws 75. Each screw 75 placed through the corresponding core threaded opening 31C located in the stator core 31 is further placed into the corresponding base threaded hole 44A in the stator base 40. The stator base 40 and the stator core 31 are fastened together with the screws 75.

The pipe 43 supports the rotor shaft 20 with a bearing 21 between them. The bearing 21 is received in the pipe 43. The rotor shaft 20 includes an upper portion located in the pipe 43. The bearing 21 rotatably supports the upper portion of the rotor shaft 20. The rotor shaft 20 is supported by the pipe 43 with the bearing 21 between them.

The stator base 40 in the embodiment includes an annular plate 45 located on the upper end of the pipe 43. The bearing 21 has its upper surface located below the lower surface of the annular plate 45. A wave washer 22 is located between the upper surface of the bearing 21 and the lower surface of the annular plate 45. The bearing 21 has its outer circumferential surface supported on the inner surface of the pipe 43. The bearing 21 has the upper surface supported by the annular plate 45 with the wave washer 22 between them.

The sensor board 50 is supported by the stator base 40. The sensor board 50 is in contact with the stator base 40. The sensor board 50 is fixed to the stator base 40. The sensor board 50 includes magnetic sensors 51. The magnetic sensors 51 detect the magnetic flux of the magnets 13 in the rotor 10. The magnetic sensors 51 detect changes of the magnetic flux resulting from rotation of the rotor 10 to detect the position of the rotor 10 in the rotation direction. The sensor board 50 is supported by the stator base 40 with the magnetic sensors 51 facing the magnets 13. The sensor board 50 is radially outward from the coils 33.

The motor housing 60 accommodates the rotor 10 and the stator 30. The motor housing 60 is connected to the stator base 40. An internal space between the motor housing 60 and the stator base 40 accommodates the rotor 10 and the stator 30.

The motor housing 60 includes a plate 61, a peripheral wall 62, and a flange 63.

The plate 61 is substantially annular. The plate 61 is located below the rotor cup 11. The plate 61 includes a pipe 64 in its center. A lower portion of the rotor shaft 20 is located in the pipe 64.

The motor housing 60 supports a bearing 23. The bearing 23 rotatably supports the lower portion of the rotor shaft 20. The motor housing 60 in the embodiment includes an annular plate 65 located at the lower end of the pipe 64. The bearing 23 has the lower surface located above the upper surface of the annular plate 65. The bearing 23 has the outer circumferential surface supported on the inner surface of the pipe 64. The bearing 23 has the lower surface supported on the upper surface of the annular plate 65.

The peripheral wall 62 is substantially cylindrical. The peripheral wall 62 has its lower end connected to the periphery of the plate 61. The peripheral wall 62 protrudes upward from the periphery of the plate 61. The peripheral wall 62 at least partially surrounds the rotor cup 11.

The flange 63 is connected to the upper end of the peripheral wall 62. The flange 63 extends radially outward from the upper end of the peripheral wall 62. The flange 63 has multiple (four in the embodiment) through-holes 66 located circumferentially at intervals.

The peripheral wall 42 in the stator base 40 includes multiple (four in the embodiment) screw bosses 46 located circumferentially at intervals. Each of the four screw bosses 46 has a threaded hole.

The stator base 40 and the motor housing 60 are fastened together with four screws 67. The screws 67 are placed into the corresponding through-holes 66 from below the flange 63. Each screw 67 placed through the corresponding through-hole 66 has the distal end to be received in the corresponding threaded hole in the screw boss 46. Threads on the screw 67 are engaged with threaded grooves on the threaded holes in the screw bosses 46 to fasten the stator base 40 and the motor housing 60 together.

The peripheral wall 42 in the stator base 40 has multiple openings 47. One of the openings 47 receives a shock absorber 48. The shock absorber 48 is formed from, for example, rubber. The shock absorber 48 received in the opening 47 supports at least a part of a power line 91, which is described later. The shock absorber 48 prevents wear of the power line 91.

The plate 61 has an air passage 68. The air passage 68 includes a flow channel with a labyrinth structure. For the rotor shaft 20 receiving a cooling fan fixed to its lower end, the cooling fan rotates as the rotor shaft 20 rotates. The cooling fan draws air through the air passage 68 from the internal space between the stator base 40 and the motor housing 60. Air drawn through the air passage 68 causes air around the motor 4 to flow into the internal space through the openings 47. This cools the motor 4.

The rotor cup 11 includes outlets 15. The outlets 15 discharge foreign matter inside the rotor cup 11. Two outlets 15 are located in the plate 11A. For example, water entering the rotor cup 11 is discharged out of the rotor cup 11 through the outlets 15.

As shown in FIG. 2, the motor housing 60 includes screw bosses 600. The screw bosses 600 are fastened to decks 200 on the housing 2. Each deck 200 has a through-hole 201. Each screw boss 600 has a threaded hole 601. The decks 200 on the housing 2 and the motor housing 60 are fastened together with screws 202. Each screw 202 is placed into the corresponding through-hole 201 from below the corresponding deck 200. Each screw 202 placed through the corresponding through-hole 201 has the distal end to be received in the corresponding threaded hole 601 in the screw boss 600. Threads on the screws 202 are engaged with threaded grooves on the threaded holes 601 to fasten the decks 200 on the housing 2 and the motor housing 60 together.

The motor housing 60 includes screw bosses 602. The screw bosses 602 are fixed to a baffle 203. The baffle 203 changes airflow inside the motor housing 60. The baffle 203 faces the lower surface of the motor housing 60. The baffle 203 has an opening 203A in its center. The rotor shaft 20 is placed in the opening 203A.

The baffle 203 has through-holes 204. Each screw boss 602 has a threaded hole 603. The baffle 203 and the motor housing 60 are fastened together with screws 205. The screws 205 are placed into the corresponding through-holes 204 from below the baffle 203. Each screw 205 placed through the corresponding through-hole 204 has the distal end to be received in the corresponding threaded hole 603 in the screw boss 602. Threads on the screws 205 are engaged with threaded grooves on the threaded holes 603 to fasten the baffle 203 and the motor housing 60 together.

Sensor Board

Figure 10:
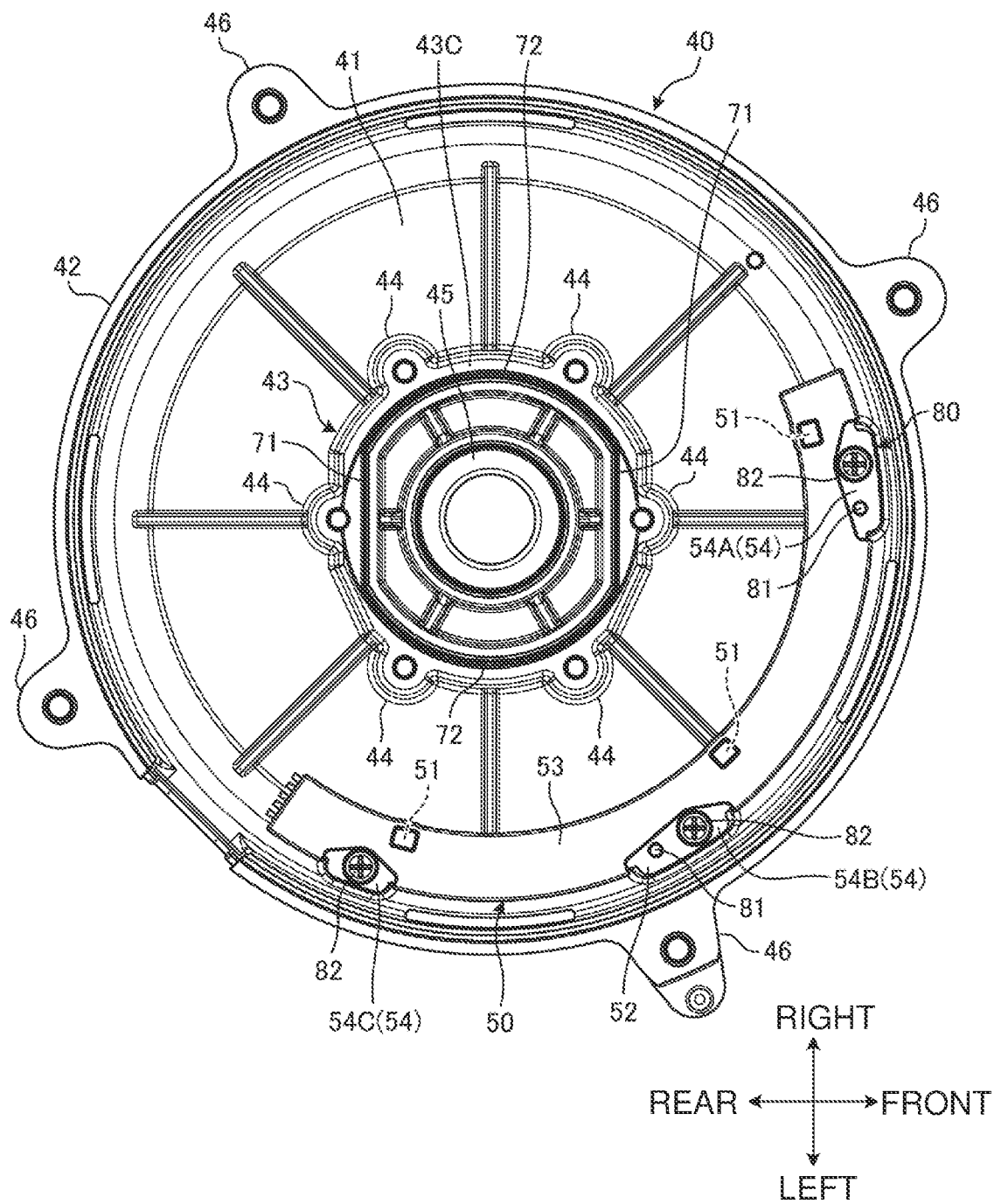
FIG. 10 is a bottom view of a stator base and a sensor board in the embodiment.
Figure 11:
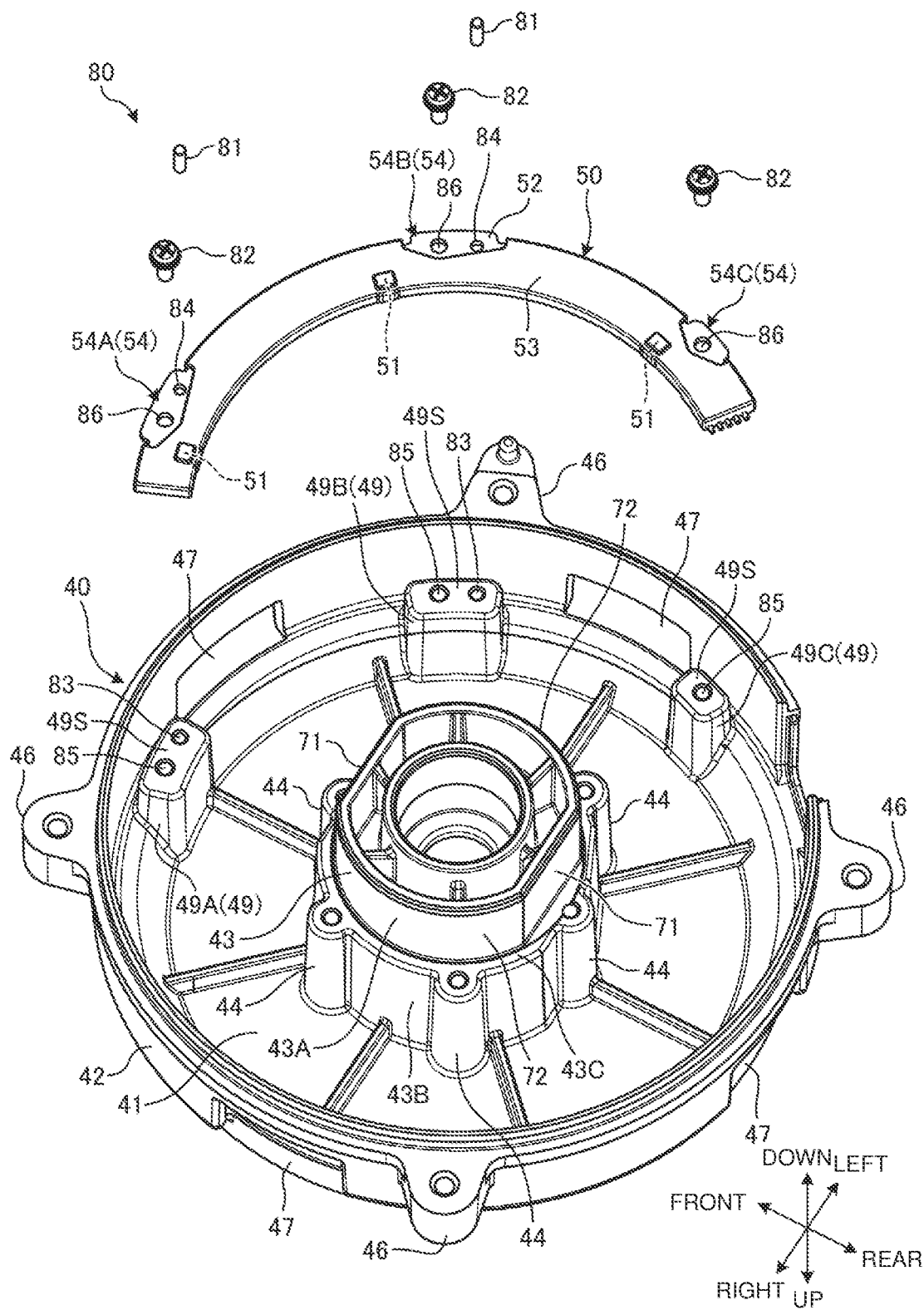
FIG. 11 is an exploded perspective view of the stator base and the sensor board in the embodiment as viewed from below.

FIG. 10 is a bottom view of the stator base 40 and the sensor board 50 in the embodiment. FIG. 11 is an exploded perspective view of the stator base 40 and the sensor board 50 in the embodiment as viewed from below.

The sensor board 50 is substantially arc-shaped. The sensor board 50 includes a circuit board 52 and a resin layer 53. The resin layer 53 at least partially covers a surface of the circuit board 52. The circuit board 52 includes a printed circuit board (PCB). The circuit board 52 has an upper surface and a lower surface. The magnetic sensors 51 are located on the lower surface of the circuit board 52.

In the embodiment, the resin layer 53 at least partially covers the magnetic sensors 51 and the surface of the circuit board 52. The resin layer 53 at least partially covers the upper surface of the circuit board 52. The resin layer 53 at least partially covers the lower surface of the circuit board 52. The surfaces of the circuit board 52 receive multiple electronic components in addition to the magnetic sensors 51. Examples of the electronic components mountable on the surfaces of the circuit board 52 include capacitors, resistors, and thermistors. The resin layer 53 also covers these electronic components.

The sensor board 50 is supported by the stator base 40. The sensor board 50 is fixed to the stator base 40. The stator base 40 includes bases 49. The base 49 is located inside the peripheral wall 42. The base 49 protrudes downward from the plate 41.

The stator base 40 includes multiple (three in the embodiment) bases 49. Each base 49 includes a base 49A, a base 49B, and a base 49C.

The sensor board 50 is supported by the bases 49. The sensor board 50 in contact with the bases 49 is fastened to the bases 49.

Each of the bases 49 has a support surface 49S facing the upper surface of the sensor board 50. Each support surface 49S faces downward. The sensor board 50 includes support areas 54 each supported by the corresponding base 49. Each of the support areas 54 is defined on the surface of the circuit board 52. No resin layer 53 is located on the support areas 54. The sensor board 50 is fastened to the bases 49 with the upper surface of each support area 54 in contact with the corresponding support surface 49S of the base 49.

The support areas 54 include a support area 54A, a support area 54B, and a support area 54C. The support area 54A is supported by the base 49A. The support area 54B is supported by the base 49B. The support area 54C is supported by the base 49C.

The motor 4 includes a board positioner 80 for positioning the stator base 40 and the sensor board 50. The board positioner 80 includes pins 81 and screws 82.

The bases 49 in the stator base 40 each have a base pin hole 83. The support areas 54 in the sensor board 50 each have a board pin hole 84. The pin 81 is placed into both the base pin hole 83 and the board pin hole 84.

The board positioner 80 includes at least two (two in the embodiment) pins 81 located circumferentially at intervals.

The base 49A and the base 49B each have one base pin hole 83. The support area 54A and the support area 54B each have one board pin hole 84.

The pins 81 are press-fitted into the corresponding base pin holes 83. Thus, the pins 81 are fixed to the bases 49. The pins 81 press-fitted into the corresponding base pin holes 83 are subsequently received in the corresponding board pin holes 84.

The bases 49 in the stator base 40 each have a base threaded hole 85. The support areas 54 in the sensor board 50 each have a board threaded opening 86. Each screw 82 is placed through the corresponding board threaded opening 86 and is received in the corresponding base threaded hole 85 in the stator base 40. Thus, the bases 49 and the sensor board 50 are fastened together with the screws 82.

The board positioner 80 includes at least three (three in the embodiment) screws 82 located circumferentially at intervals.

Each of the base 49A, the base 49B, and the base 49C has one base threaded hole 85. Each of the support area 54A, the support area 54B, and the support area 54C has one board threaded opening 86.

Rotor

Figure 12:
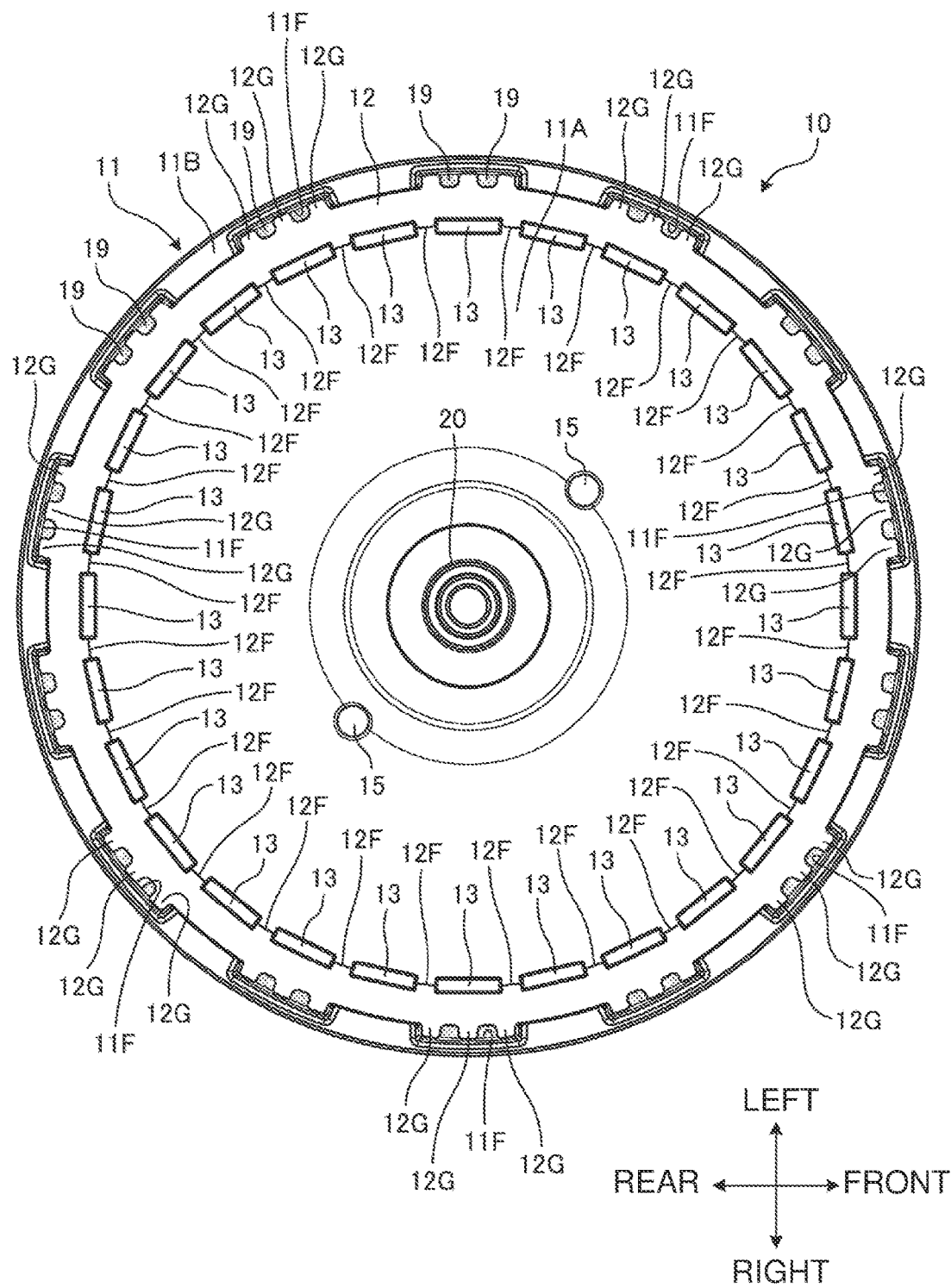
FIG. 12 is a top view of a rotor in the embodiment.
Figure 13:
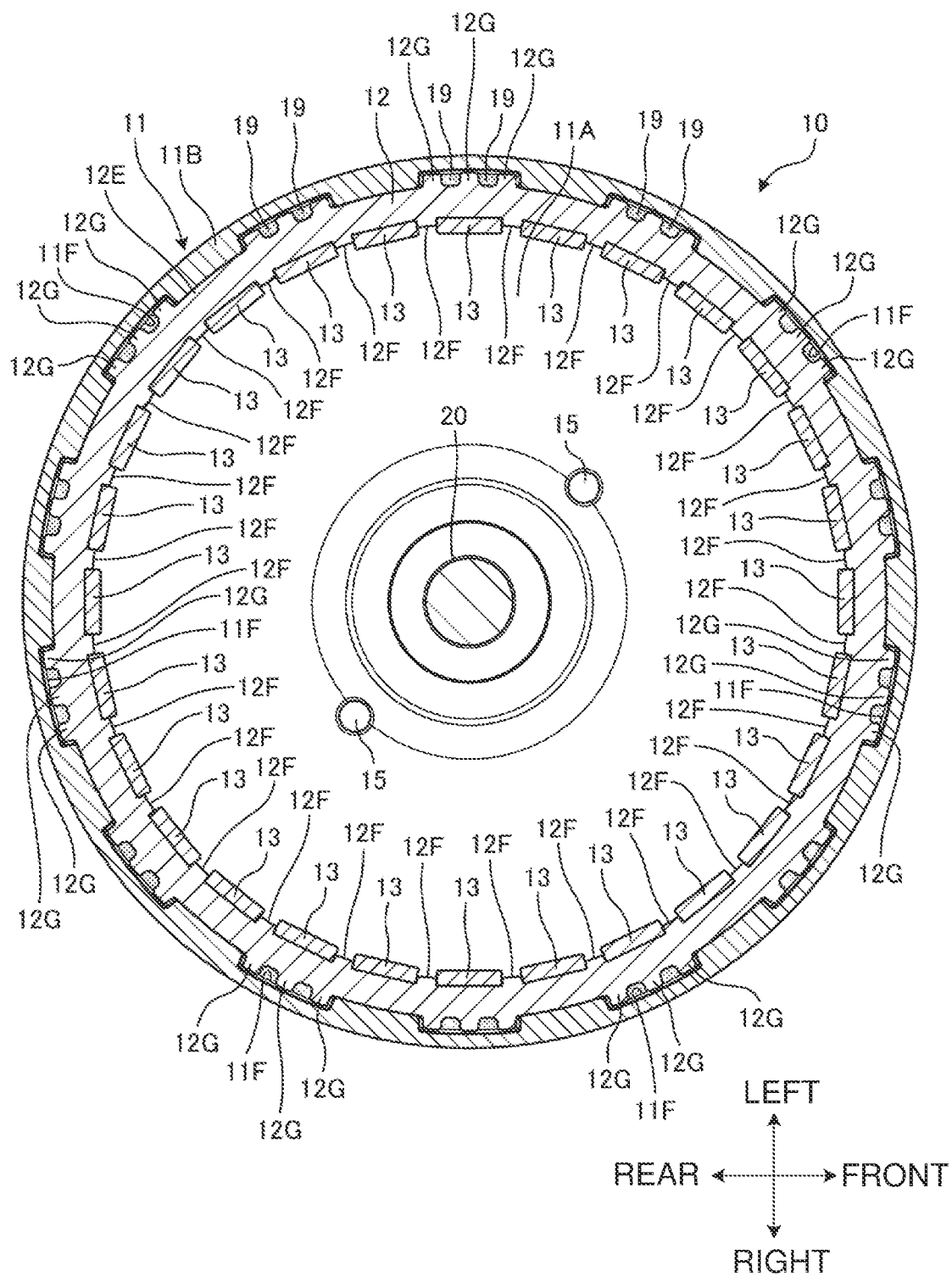
FIG. 13 is a cross-sectional view of the rotor in the embodiment.
Figure 14:
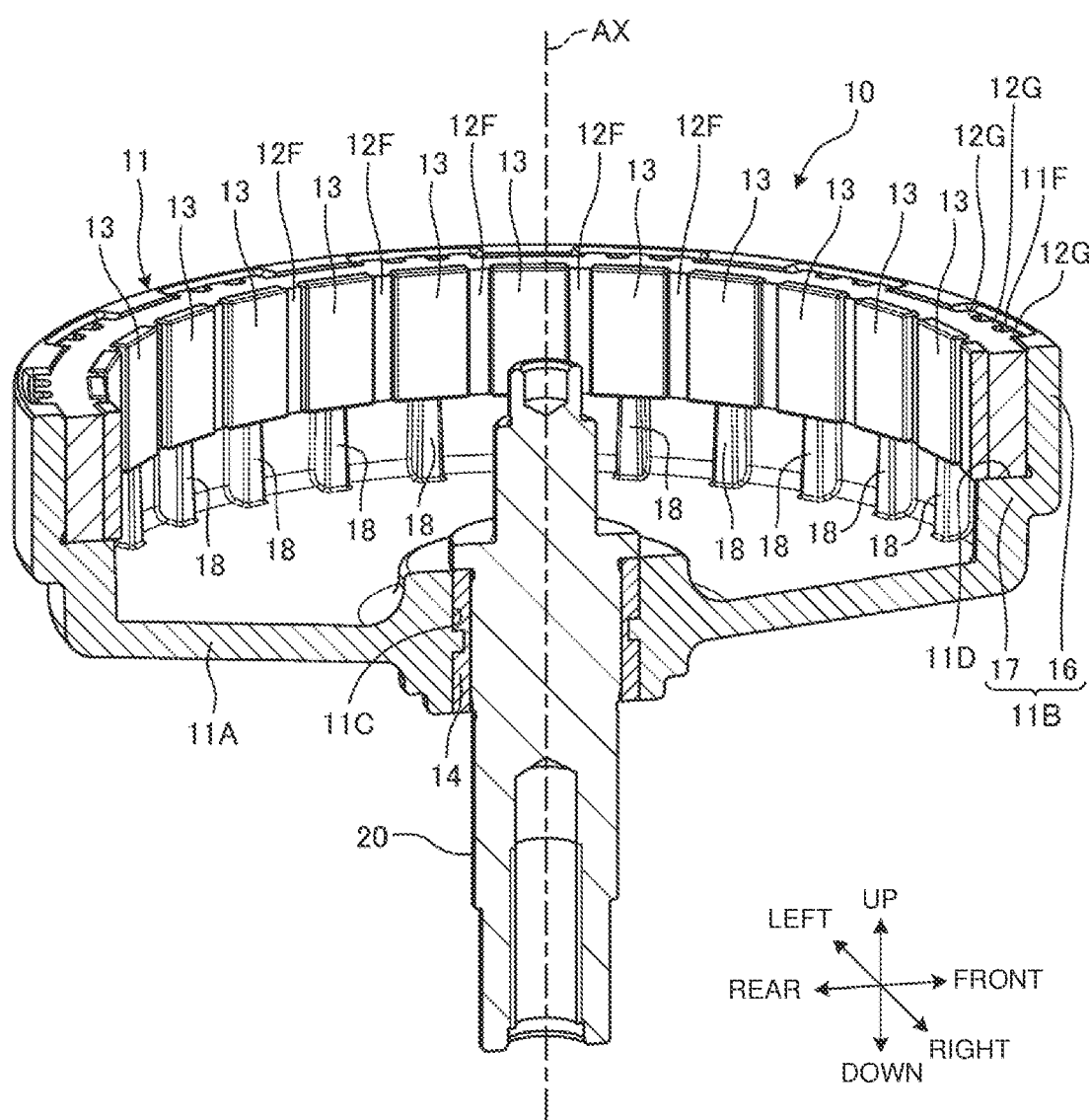
FIG. 14 is a perspective cross-sectional view of the rotor in the embodiment.
Figure 15:
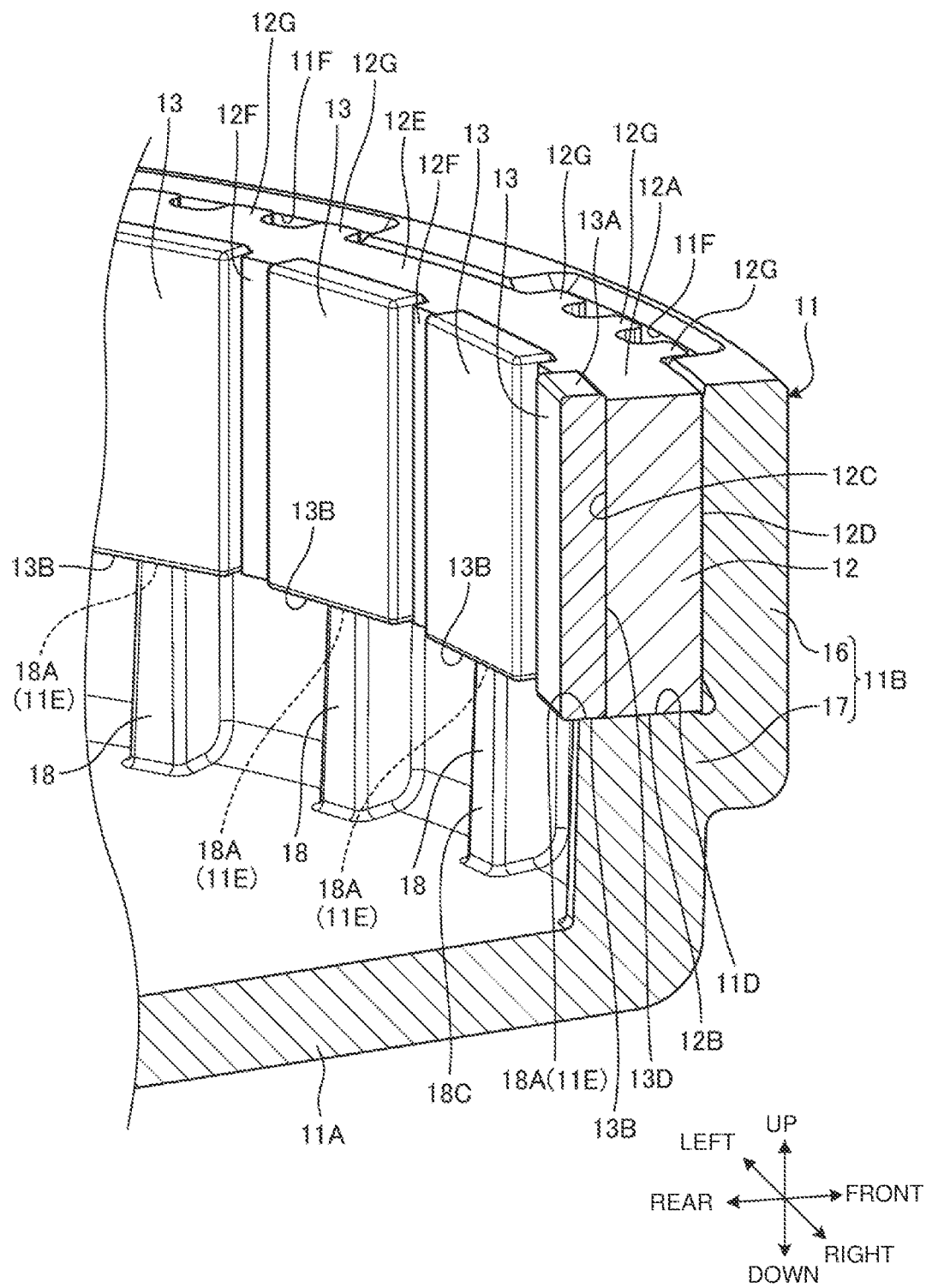
FIG. 15 is a partially enlarged perspective cross-sectional view of the rotor in the embodiment.
Figure 16:
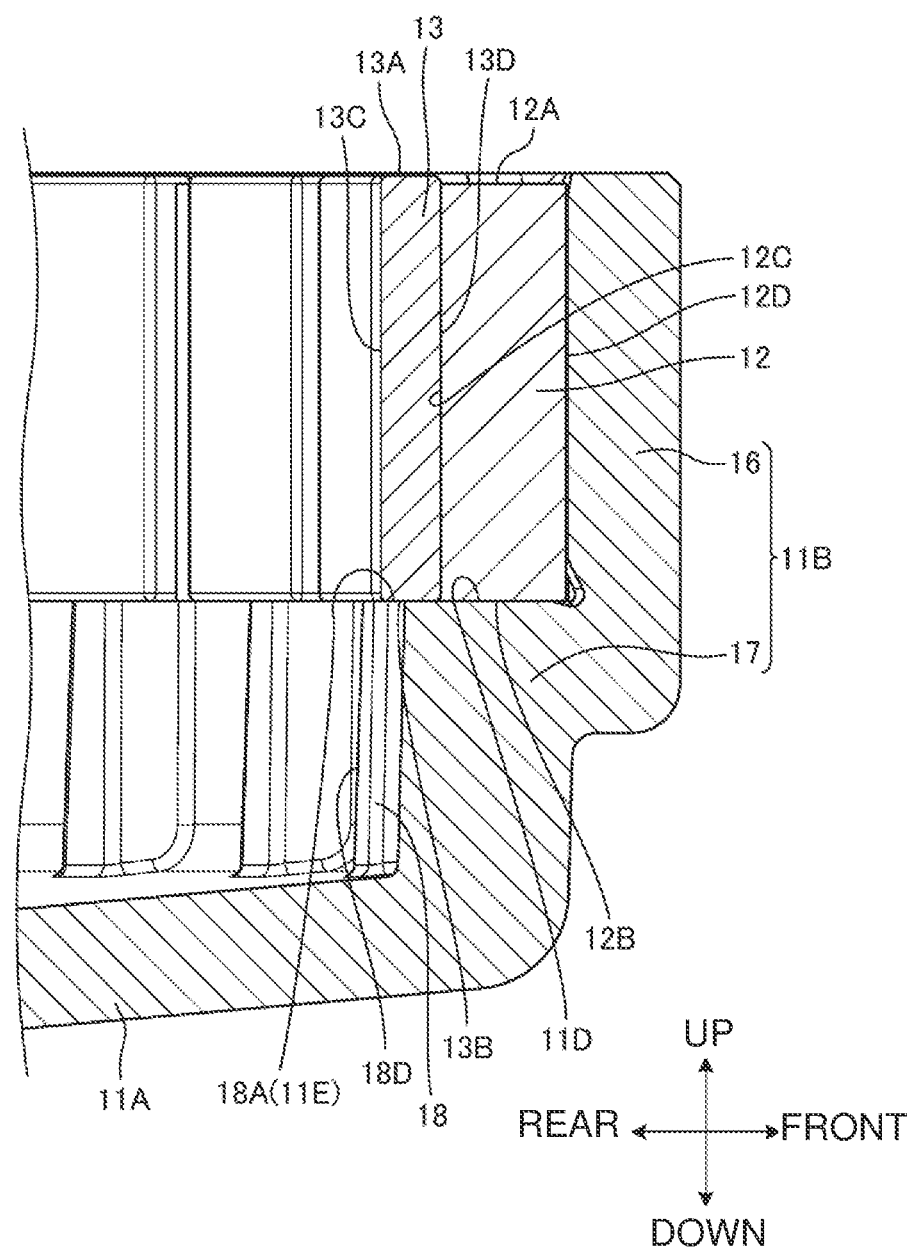
FIG. 16 is a partially enlarged longitudinal cross-sectional view of the rotor in the embodiment.

FIG. 12 is a top view of the rotor 10 in the embodiment. FIG. 13 is a cross-sectional view of the rotor 10 in the embodiment. FIG. 14 is a perspective cross-sectional view of the rotor 10 in the embodiment. FIG. 15 is a partially enlarged perspective cross-sectional view of the rotor 10 in the embodiment. FIG. 16 is a partially enlarged longitudinal cross-sectional view of the rotor 10 in the embodiment.

The rotor 10 includes the rotor cup 11, the rotor core 12, and the magnets 13. The rotor core 12 is supported by the rotor cup 11. The magnets 13 are fixed to the rotor core 12.

The magnets 13 are located radially inside the rotor core 12. Each magnet 13 has an upper end face 13A, a lower end face 13B, an inner end face 13C, and an outer end face 13D. The upper end face 13A faces upward. The lower end face 13B faces downward. The inner end face 13C faces radially inward. The outer end face 13D faces radially outward.

The rotor core 12 has an upper end face 12A, a lower end face 12B, an inner circumferential surface 12C, and an outer circumferential surface 12D. The upper end face 12A faces upward. The lower end face 12B faces downward. The inner circumferential surface 12C faces radially inward. The outer circumferential surface 12D faces radially outward. The inner circumferential surface 12C of the rotor core 12 faces the outer end faces 13D of the magnets 13.

The rotor cup 11 includes the plate 11A and the yoke 11B. The yoke 11B includes a larger-diameter portion 16, a smaller-diameter portion 17, and ribs 18.

The larger-diameter portion 16 is located upward from the smaller-diameter portion 17. The larger-diameter portion 16 and the smaller-diameter portion 17 each surround the rotation axis AX. The inner circumferential surfaces of the larger-diameter portion 16 and the smaller-diameter portion 17 each face radially inward. The inner circumferential surface of the larger-diameter portion 16 is radially outward from the inner circumferential surface of the smaller-diameter portion 17.

A core support surface 11D is located at the boundary between the larger-diameter portion 16 and the smaller-diameter portion 17. The core support surface 11D is annular and surrounds the rotation axis AX. The core support surface 1D faces upward. The core support surface 11D supports the lower end face 12B of the rotor core 12.

The core support surface 11D also supports at least parts of the lower end faces 13B of the magnets 13.

The ribs 18 are located in the first axial direction or downward from the core support surface 11D. The ribs 18 are located on the inner circumferential surface of the smaller-diameter portion 17. The ribs 18 protrude radially inward from the inner circumferential surface of the smaller-diameter portion 17.

Each rib 18 has an upper end face 18A and an inner end face 18C. The upper end face 18A is located in the second (upper) axial direction. The inner end face 18C faces radially inward.

The upper end face 18A of the rib 18 is a magnet support surface 11E supporting at least a part of the lower end face 13B of the corresponding magnet 13. The magnet support surface 11E in the embodiment supports a part of the lower end face 13B of each magnet 13.

The ribs 18 are circumferentially smaller than the magnets 13. Each rib 18 is circumferentially aligned to the middle of the corresponding magnet 13. In other words, the magnet support surface 11E circumferentially supports the middle of the lower end face 13B of each magnet 13.

The inner end face 18C of each rib 18 is located radially outward from the inner end face 13C of the corresponding magnet 13. In other words, the magnet support surface 11E has an inner edge located radially outward from the inner edge of the lower end face 13B of the magnet 13.

The number of ribs 18 is the same as the number of magnets 13. The rotor 10 in the embodiment includes the 28 magnets 13. The yoke 11B in the embodiment includes 28 ribs 18.

The upper end faces 13A of the magnets 13 protrude upward from the upper end face 12A of the rotor core 12.

The rotor core 12 includes a ring 12E and inner protrusions 12F. The ring 12E has the inner circumferential surface 12C. The inner protrusions 12F protrude radially inward from the inner circumferential surface 12C of the ring 12E. The inner protrusions 12F are located between the magnets 13 circumferentially adjacent to each other.

The ring 12E in the rotor core 12 has the outer circumferential surface 12D including outer protrusions 12G. The outer protrusions 12G are in contact with the inner circumferential surface of the yoke 11B of the rotor cup 11. Multiple outer protrusions 12G are located circumferentially at intervals. The rotor cup 11 has the inner circumferential surface having recesses 11F to receive the outer protrusions 12G. One recess 11F receives three outer protrusions 12G.

The multiple (three) outer protrusions 12G in the recess 11F receive an adhesive, which is filled between the outer protrusions 12G adjacent to each other. Thus, an adhesive layer 19 is located between the outer protrusions 12G adjacent to each other. The adhesive layer 19 fixes the rotor core 12 and the rotor cup 11 together.

Insulator

Figure 17:
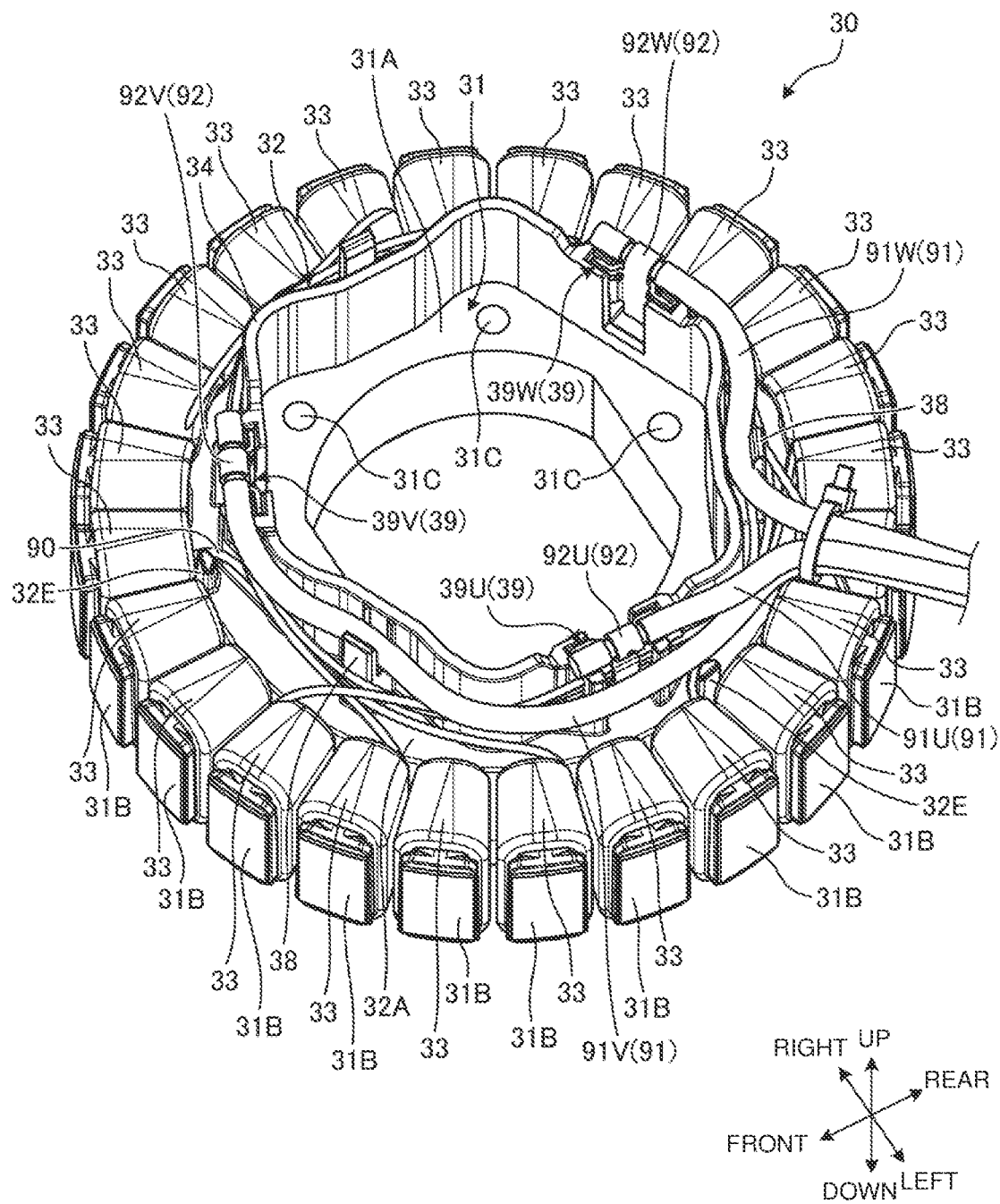
FIG. 17 is a perspective view of a stator in the embodiment as viewed from above.
Figure 18:
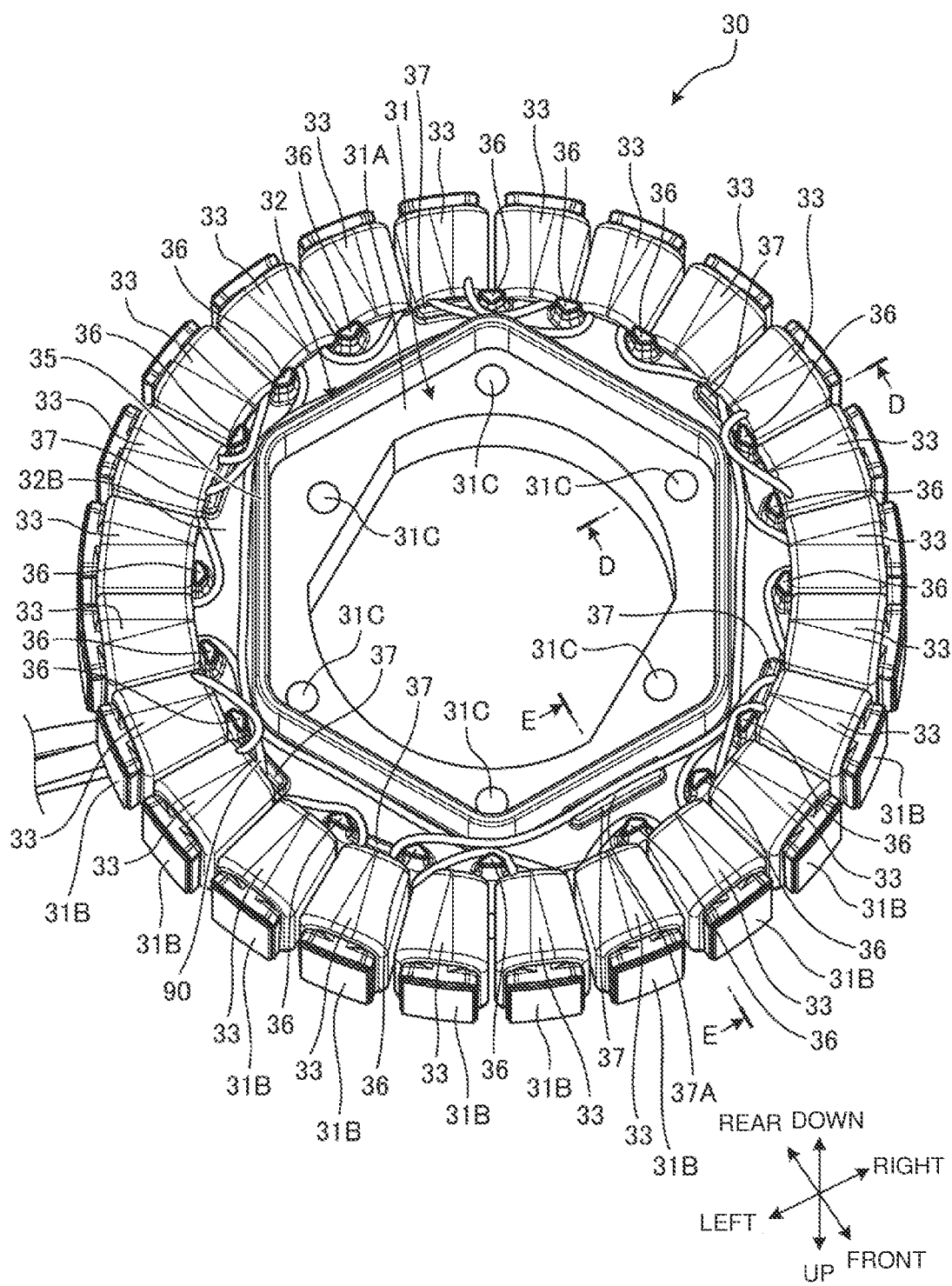
FIG. 18 is a perspective view of the stator in the embodiment as viewed from below.
Figure 19:
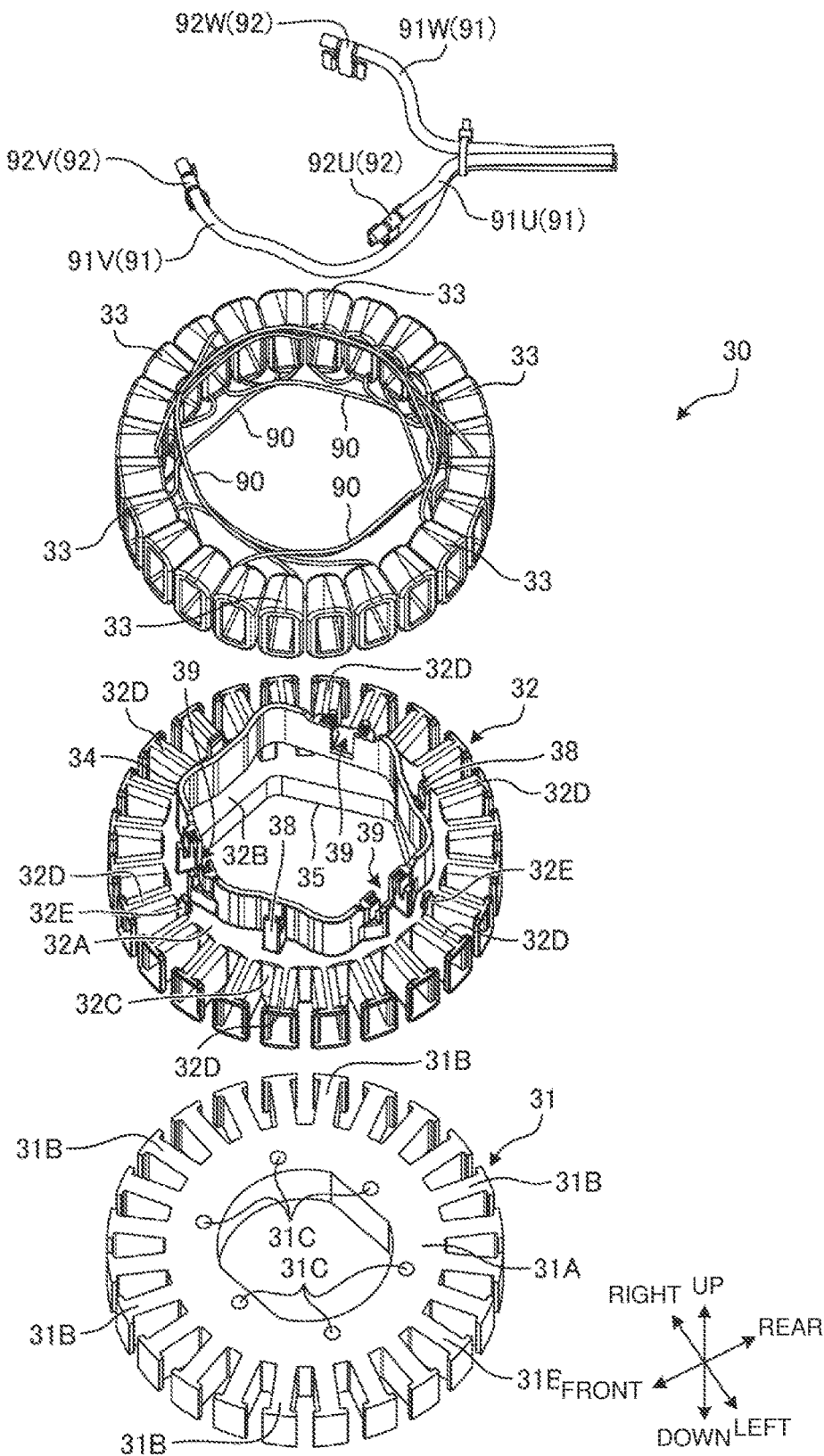
FIG. 19 is an exploded perspective view of the stator in the embodiment as viewed from above.
Figure 20:
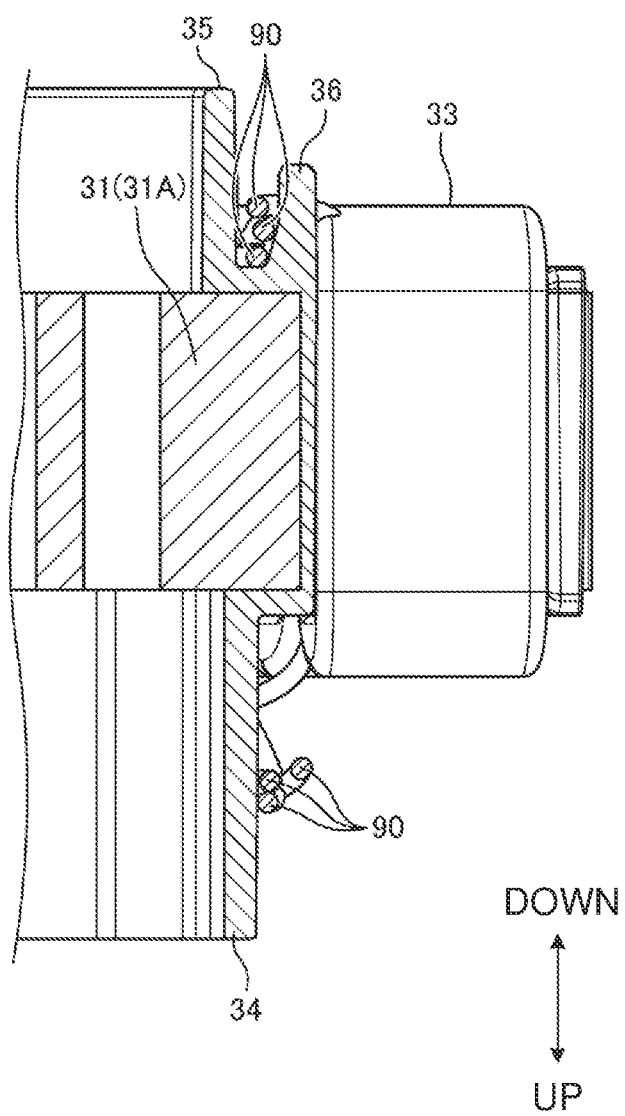
FIG. 20 is a partial cross-sectional view of the stator in the embodiment.
Figure 21:
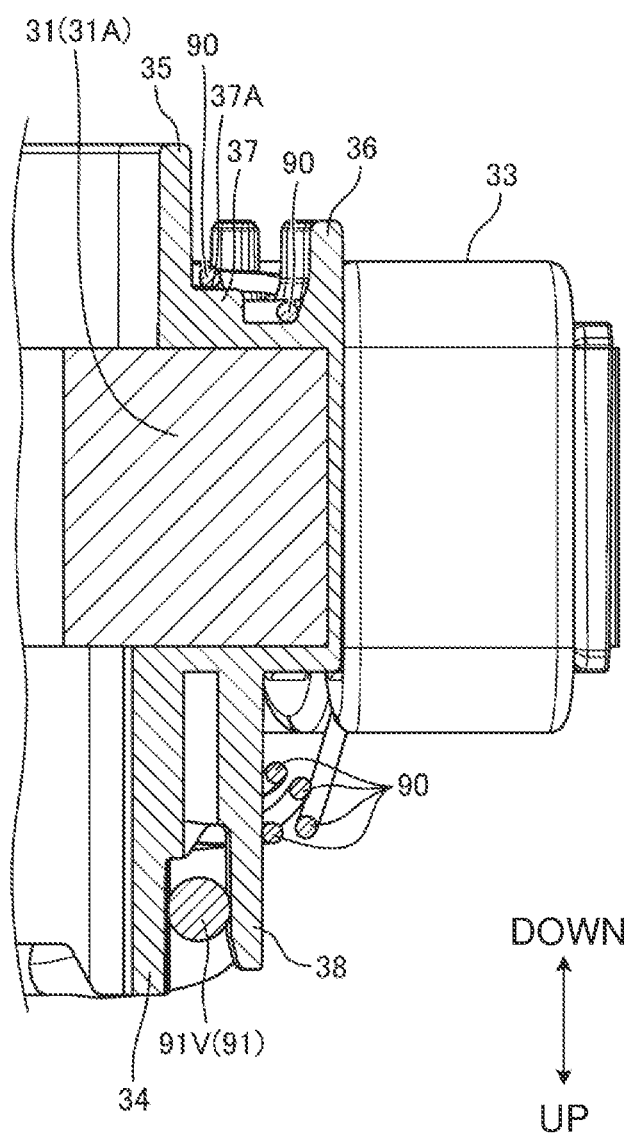
FIG. 21 is a partial cross-sectional view of the stator in the embodiment.

FIG. 17 is a perspective view of the stator 30 in the embodiment as viewed from above. FIG. 18 is a perspective view of the stator 30 in the embodiment as viewed from below. FIG. 19 is an exploded perspective view of the stator 30 in the embodiment as viewed from above. FIG. 20 is a partial cross-sectional view of the stator 30 in the embodiment. FIG. 20 is a cross-sectional view taken along line D-D in FIG. 18 as viewed in the direction indicated by arrows. FIG. 21 is a partial cross-sectional view of the stator 30 in the embodiment. FIG. 21 is a cross-sectional view taken along line E-E in FIG. 18 as viewed in the direction indicated by arrows.

The insulator 32 includes an upper end cover 32A, a lower end cover 32B, an outer circumference cover 32C, and a tooth cover 32D.

The upper end cover 32A covers a peripheral edge of the upper end face of the yoke 31A. The lower end cover 32B covers a peripheral edge of the lower end face of the yoke 31A. The outer circumference cover 32C covers an outer circumferential surface of the yoke 31A facing radially outward. The tooth cover 32D covers surfaces of the teeth 31B around which the coils 33 are wound.

The insulator 32 includes an upper peripheral wall 34, a lower peripheral wall 35, ribs 36, protrusions 37, retainers 38, and receptacles 39.

The upper peripheral wall 34 surrounds the rotation axis AX. The upper peripheral wall 34 protrudes upward from the upper end cover 32A. The upper peripheral wall 34 is located radially inward from the coils 33.

The lower peripheral wall 35 surrounds the rotation axis AX. The lower peripheral wall 35 protrudes downward from the lower end cover 32B. The lower peripheral wall 35 is located radially inward from the coils 33.

The ribs 36 are located on the lower end cover 32B. The ribs 36 protrude downward from the lower end cover 32B. Multiple ribs 36 are located circumferentially at intervals. The multiple ribs 36 have the same height. The ribs 36 are fewer than the coils 33.

The protrusions 37 are located on the lower end cover 32B. The protrusions 37 are shorter than the ribs 36. The number of protrusions 37 is less than the number of ribs 36. The protrusions 37 are fewer than the coils 33.

The retainers 38 are located on the upper peripheral wall 34. Each retainer 38 includes a hook located on the outer circumferential surface of the upper peripheral wall 34.

The receptacles 39 are located on the upper peripheral wall 34.

The insulator 32 includes multiple ribs 32E. Each rib 32E protrudes upward from the upper end cover 32A.

The multiple coils 33 include a wound single wire 90. The single wire 90 is sequentially wound around each of the teeth 31B with the tooth cover 32D between them. The wire 90 connects a first coil 33 and a second coil 33 wound after the first coil 33.

Each rib 36 supports the wire 90 connecting the multiple coils 33. The wire 90 is placed on each rib 36. The wire 90 extends from radially inside the rib 36 and is placed on the corresponding rib 36. Each rib 36 supports the wire 90. The wire 90 thus extends from the lower end cover 32B and is placed into a space between the teeth 31B adjacent to each other. As described above, the teeth 31B adjacent to each other define a slot between them. Each rib 36 thus supports the wire 90 to allow the wire 90 extending from the lower end cover 32B to be placed into the slot. Each rib 36 guides the wire 90 from the lower end cover 32B to the lower end of the slot.

The wire 90 includes multiple portions located on the lower end cover 32B. The wire 90 includes overlapping portions. For example, the wire 90 includes a first portion connecting the first coil 33 and the second coil 33 on the lower end cover 32B. The wire 90 includes a second portion connecting a third coil 33 and a fourth coil 33 also on the lower end cover 32B. The second portion of the wire 90 at least partially overlaps the first portion of the wire 90. The protrusion 37 supports the second portion of the wire 90, and the first portion of the wire 90 is less likely to come in contact with the second portion of the wire 90.

When the second portion of the wire 90 is located partially covering the first portion of the wire 90, the protrusion 37 supports the second portion of the wire 90. The protrusion 37 has a support surface 37A for supporting the second portion of the wire 90. The support surface 37A has the lower surface of the protrusion 37. The support surface 37A faces downward. The second portion of the wire 90 is at least partially located on the support surface 37A of the protrusion 37.

A driving current is supplied to the coils 33. The driving current is supplied to the coils 33 through the power lines 91 and fusing terminals 92. The driving current supplied to the coils 33 flows through the power lines 91 and the fusing terminals 92.

Each of the 24 coils 33 is assigned to one of a U- (UV-) phase, a V- (VW-) phase, and a W- (WU-) phase. The power lines 91 include a power line 91U, a power line 91V, and a power line 91W. The U-phase driving current flows through the power line 91U. The V-phase driving current flows through the power line 91V. The W-phase driving current flows through the power line 91W.

The retainers 38 hold the power lines 91. Each retainer 38 includes a hook for receiving the corresponding power line 91. The insulator 32 in the embodiment includes two retainers 38. The power line 91V is placed on one retainer 38. The power line 91W is placed on the other retainer 38.

The retainer 38 at least partially protrudes radially outward from the outer circumferential surface of the upper peripheral wall 34. At least a part of the power line 91 surrounds the outer circumferential surface of the upper peripheral wall 34. At least a part of the power line 91 is located between the upper peripheral wall 34 and the retainers 38. At least a part of the power line 91 is supported on the outer circumferential surface of the upper peripheral wall 34.

The fusing terminals 92 connect different portions of the wire 90 protruding from the multiple coils 33. The fusing terminals 92 include a fusing terminal 92U, a fusing terminal 92V, and a fusing terminal 92W. A U-phase driving current flows through the fusing terminal 92U. A V-phase driving current flows through the fusing terminal 92V A W-phase driving current flows through the fusing terminal 92W.

The power line 91U is connected to the fusing terminal 92U. The power line 91V is connected to the fusing terminal 92V. The power line 91W is connected to the fusing terminal 92W.

The fusing terminal 92 is placed into the corresponding receptacle 39 located in the upper peripheral wall 34. The receptacles 39 include a receptacle 39U, a receptacle 39V, and a receptacle 39W. The receptacle 39U receives the fusing terminal 92U. The receptacle 39V receives the fusing terminal 92V. The receptacle 39W receives the fusing terminal 92W.

Figure 22:
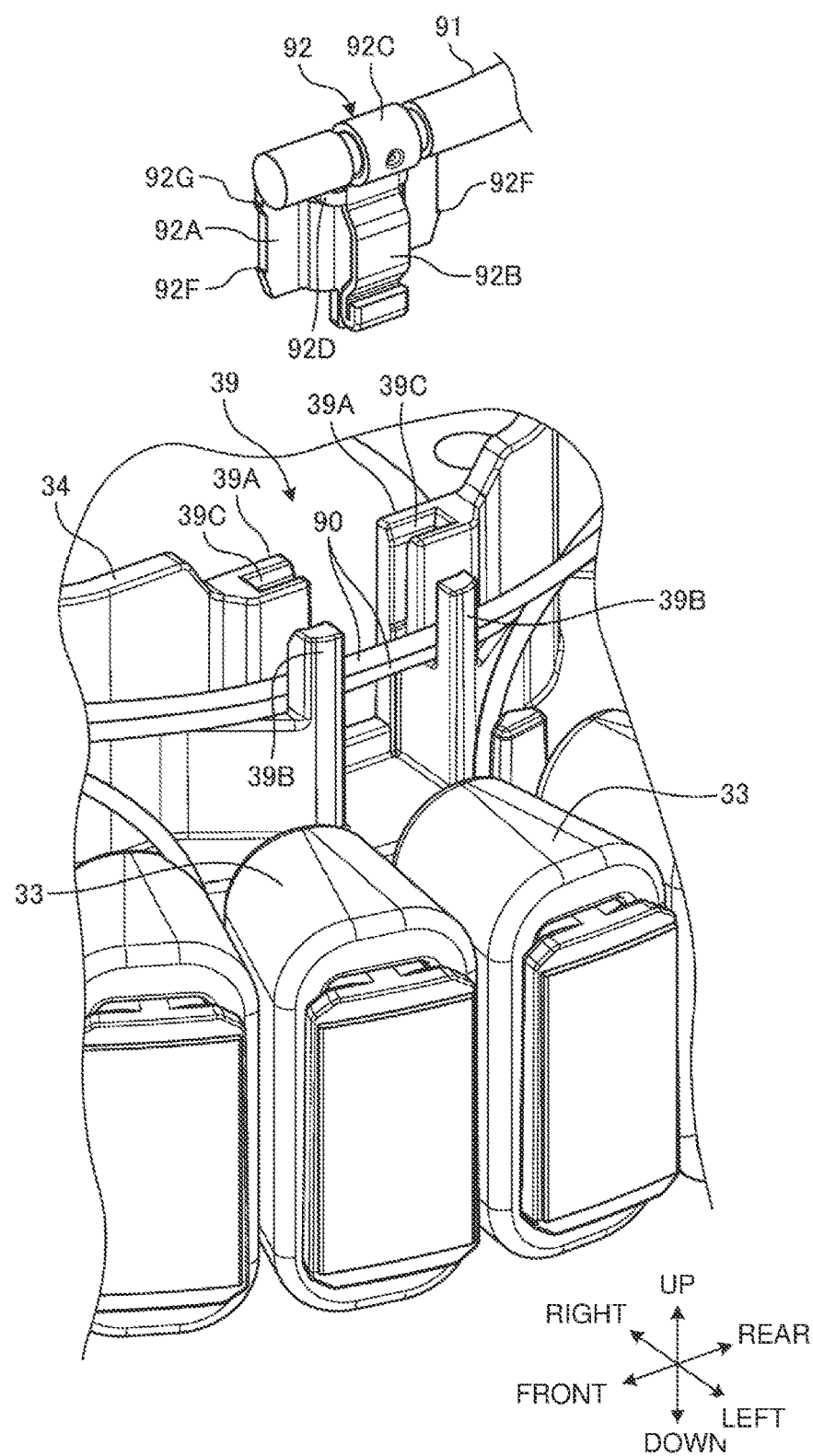
FIG. 22 is a perspective view of a fusing terminal and a receptacle in the embodiment.
Figure 23:
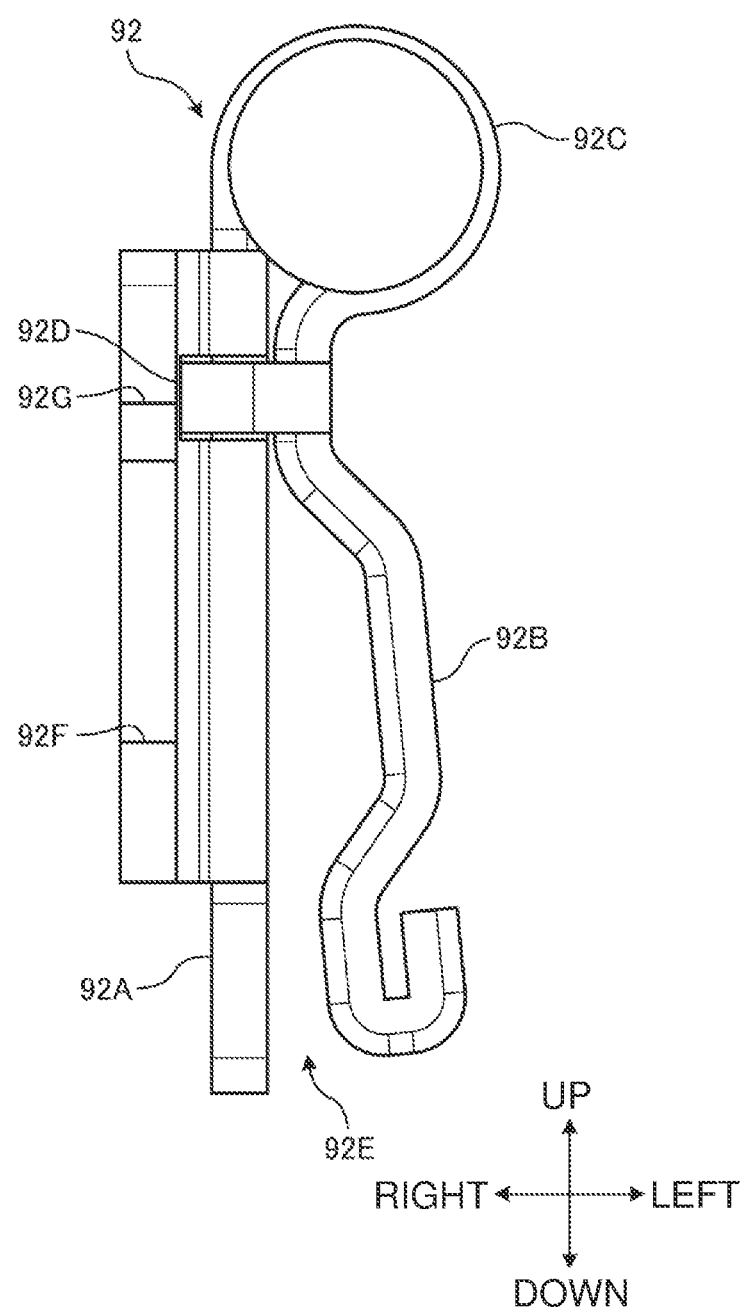
FIG. 23 is a side view of the fusing terminal in the embodiment.
Figure 24:
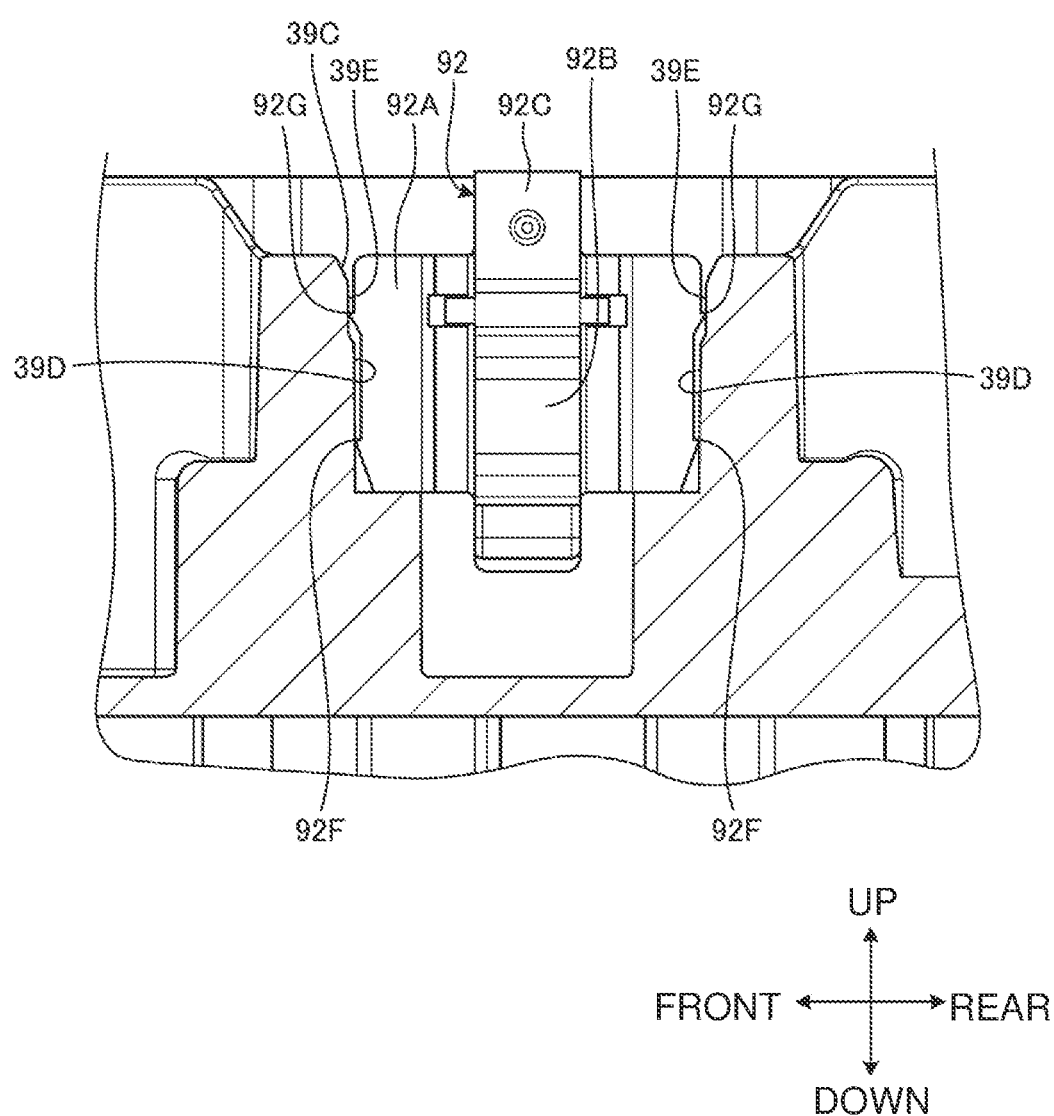
FIG. 24 is a cross-sectional view of the fusing terminal received in the receptacle in the embodiment.

FIG. 22 is a perspective view of the fusing terminal 92 and the receptacle 39 in the embodiment. FIG. 23 is a side view of the fusing terminal 92 in the embodiment. FIG. 24 is a cross-sectional view of the fusing terminal 92 received in the receptacle 39 in the embodiment. As shown in FIG. 22, the fusing terminal 92 is placed in the receptacle 39, which receives multiple portions of the wire 90. In other words, the wire 90 is placed in the receptacle 39 before the fusing terminal 92 is received in the receptacle 39.

The fusing terminal 92 includes a base plate 92A, a holder plate 92B, a ring 92C, and a fastener 92D. The holder plate 92B and the base plate 92A hold the wire 90 between them. The ring 92C holds the power line 91. The fastener 92D connects the base plate 92A and the holder plate 92B. An opening 92E is defined between the lower end of the base plate 92A and the lower end of the holder plate 92B.

The fusing terminal 92 includes lower anchors 92F and upper anchors 92G on the base plate 92A. The lower anchors 92F are located downward from the upper anchors 92G. The fusing terminal 92 includes two lower anchors 92F. The fusing terminal 92 includes two upper anchors 92G. In FIG. 24, one lower anchor 92F protrudes frontward from the front of the base plate 92A. The other lower anchor 92F protrudes rearward from the rear of the base plate 92A. In FIG. 24, one upper anchor 92G protrudes frontward from the front of the base plate 92A. The other upper anchor 92G protrudes rearward from the rear of the base plate 92A.

Each receptacle 39 includes a pair of compartments 39A and a pair of hooks 39B. The pair of compartments 39A are circumferentially adjacent to each other. The pair of hooks 39B are located radially outward from the compartments 39A. Each compartment 39A includes a recess 39C to receive the corresponding base plate 92A. The wire 90 is placed between the compartments 39A and the hooks 39B.

As shown in FIG. 24, each recess 39C includes a pair of lower portions 39D and a pair of upper portions 39E on its inner surface. The pair of lower portions 39D are located in the front-rear direction. The pair of upper portions 39E are located in the front-rear direction. The distance between one lower portion 39D and the other lower portion 39D (width of the recess 39C in the lower portions 39D) is shorter than the distance between one upper portion 39E and the other upper portion 39E (width of the recess 39C in the upper portions 39E). When the base plate 92A is placed into the recesses 39C, the pairs of upper portions 39E receive the pair of lower anchors 92F between them. The base plate 92A thus stands in the recesses 39C. Subsequently, the base plate 92A is pushed further downward in the recesses 39C, and the lower anchors 92F and the upper anchors 92G are engaged with the inner surfaces of the recesses 39C. This fastens the fusing terminal 92 to the upper peripheral wall 34.

Coil Structure

Figure 25:
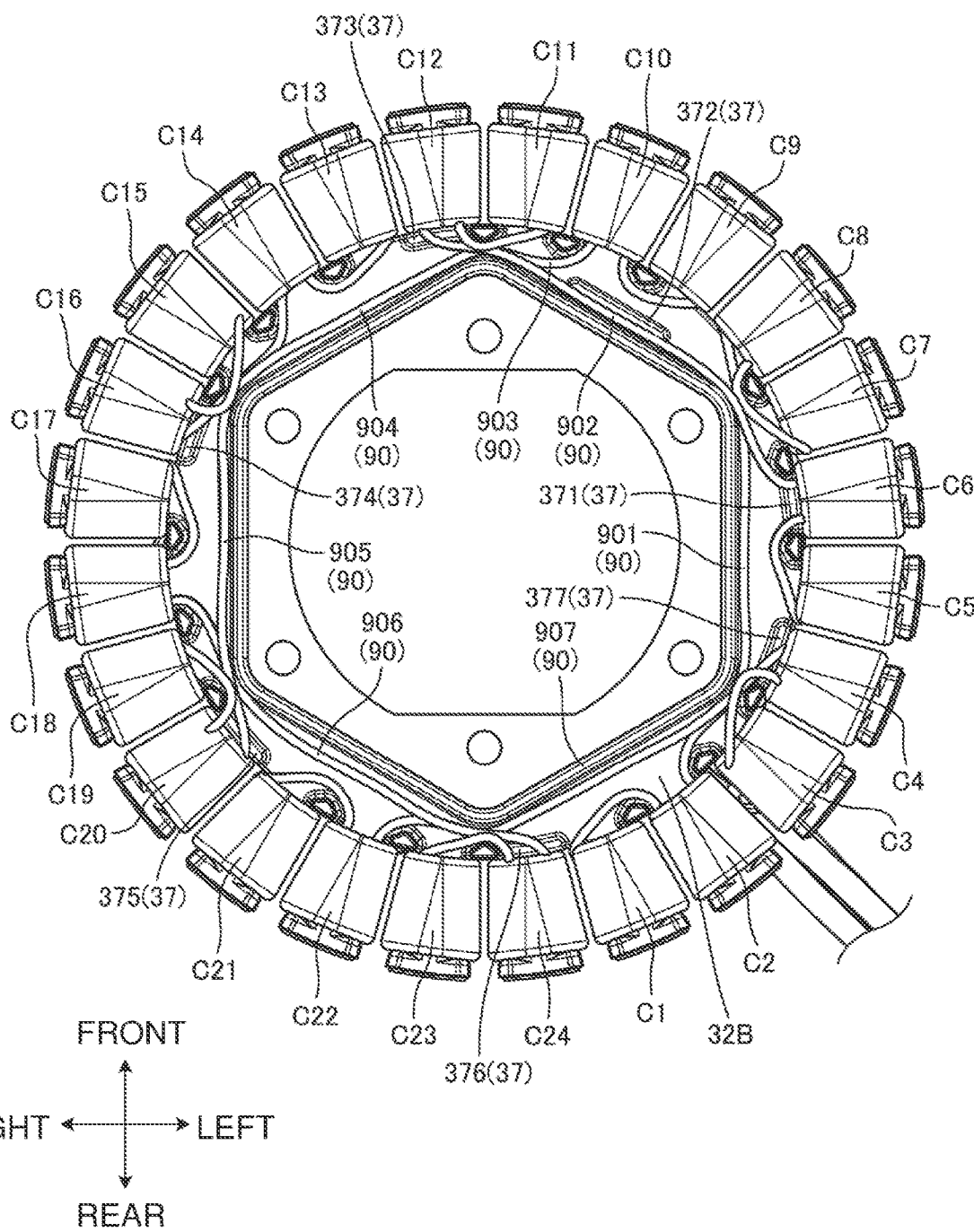
FIG. 25 is a bottom view of the stator in the embodiment.
Figure 26:
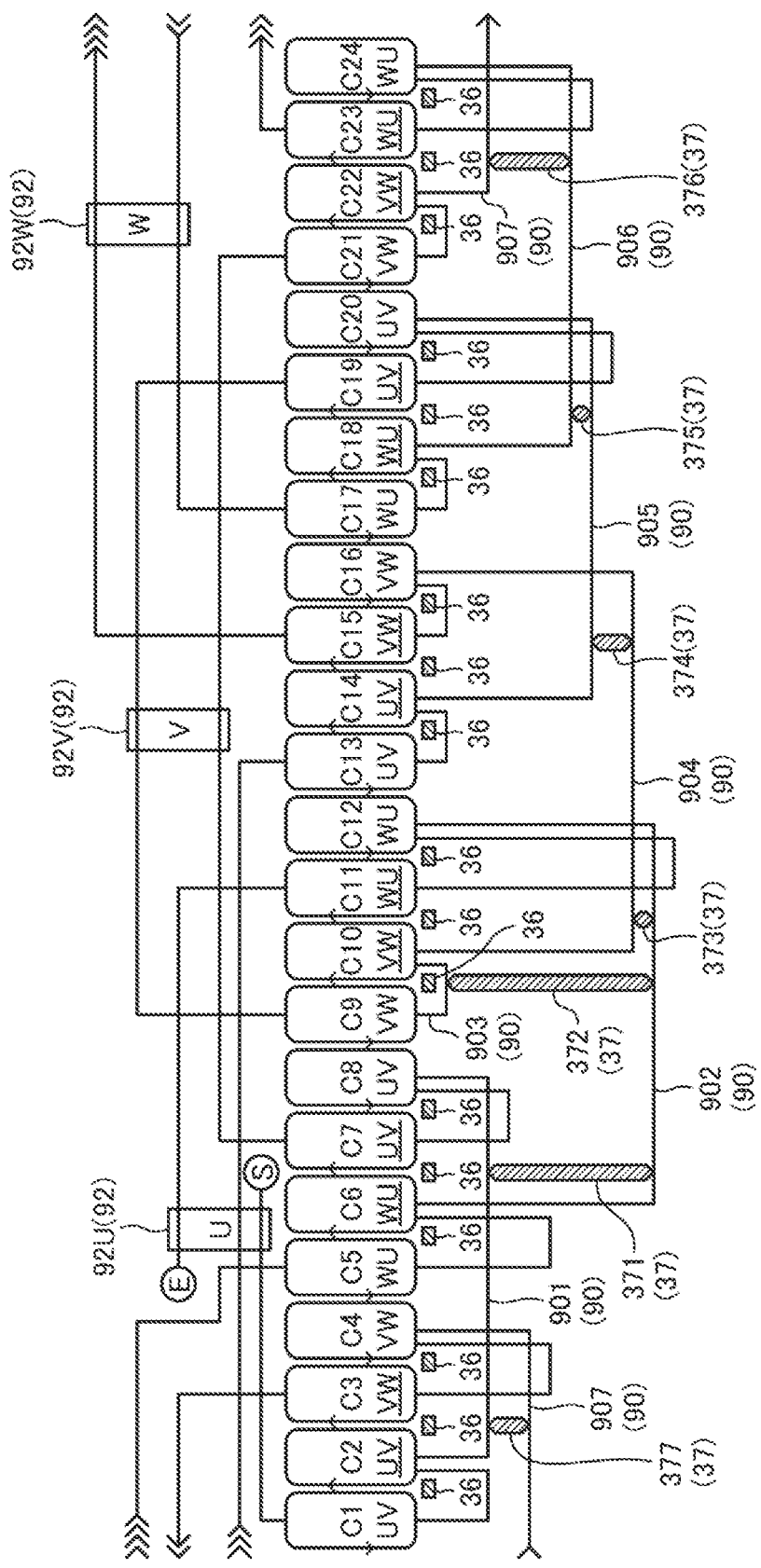
FIG. 26 is a schematic diagram of coils in the embodiment.

The structure of the coils 33 will now be described. FIG. 25 is a bottom view of the stator 30 in the embodiment. FIG. 26 is a schematic diagram of the coils 33 in the embodiment.

As described above, the stator 30 in the embodiment includes the 24 coils 33. The 24 coils 33 are numbered C1 to C24 and will be described below. The coil C1 is adjacent to the coil C2 in the first circumferential direction. The coil C2 is adjacent to the coil C3 in the first circumferential direction. Similarly, the coils C4 through C24 are each adjacent to the coils C3 through C23 in the first circumferential direction. The coil C24 is adjacent to the coil C1 in the first circumferential direction.

The 24 coils 33 are formed by winding the single wire 90. As shown in FIG. 26, the wire 90 starts being wound at a winding start S. The wire 90 is wound sequentially around each of the teeth 31B to form the multiple coils 33 sequentially. The 24 coils 33 are formed by winding the wire 90, which is wound finally at a winding end E.

In the embodiment, some of the coils 33 are formed by winding the wire 90 in the forward direction (counterclockwise). Other coils 33 are formed by winding the wire 90 in the reversed direction (clockwise). The arrows in FIG. 26 indicate the winding direction of the wire 90. The coils C1, C4, C5, C8, C9, C12, C13, C16, C17, C20, C21, and C24 are formed by winding the wire 90 in the forward direction. The coils C2, C3, C6, C7, C10, C11, C14, C15, C18, C19, C22, and C23 are formed by winding the wire 90 in the reversed direction.

The coils C1, C2, C7, C8, C13, C14, C19, and C20 are assigned to the U- (UV-) phase. The coils C3, C4, C9, C10, C15, C16, C21, and C22 are assigned to the V- (VW-) phase. The coils C5, C6, C11, C12, C17, C18, C23, and C24 are assigned to the W- (WU-) phase.

In FIG. 26, the coils 33 with letters UV are assigned to the UV-phase and are formed by winding the wire 90 in the forward direction. The letters UV are underlined for the coils 33 formed by winding the wire 90 in the reversed direction.

The coils 33 with letters VW are assigned to the VW-phase and are formed by winding the wire 90 in the forward direction. The letters VW are underlined for the coils 33 formed by winding the wire 90 in the reversed direction.

The coils 33 with letters WU are assigned to the WU-phase and are formed by winding the wire 90 in the forward direction. The letters WU are underlined for the coils 33 formed by winding the wire 90 in the reversed direction.

In the embodiment, the coil C1 is formed first. The wire 90 wound in the forward direction to form the coil C1 is then pulled toward a non-connection position below the teeth 31B (near the lower end cover 32B). The wire 90 pulled to the non-connection position is placed on the corresponding rib 36 and wound to form the coil C2.

The wire 90 wound in the reversed direction to form the coil C2 is then pulled toward the non-connection position, placed on the corresponding rib 36, and wound to form the coil C8. The wire 90 wound in the forward direction to form the coil C8 is then pulled toward the non-connection position, placed on the corresponding rib 36, and wound to form the coil C7. The wire 90 wound in the reversed direction to form the coil C7 is then pulled toward a connection position above the teeth 31B (near the upper end cover 32A).

The wire 90 pulled to the connection position is wound to form the coil C21. The wire 90 wound in the forward direction to form the coil C21 is then pulled toward the non-connection position, placed on the corresponding rib 36, and wound to form the coil C22. The wire 90 wound in the reversed direction to form the coil C22 is then pulled toward the non-connection position, placed on the corresponding rib 36, and wound to form the coil C4. The wire 90 wound in the forward direction to form the coil C4 is then pulled toward the non-connection position, placed on the corresponding rib 36, and wound to form the coil C3. The wire 90 wound in the reversed direction to form the coil C3 is then pulled toward the connection position.

The wire 90 pulled to the connection position is wound to form the coil C17. The wire 90 wound in the forward direction to form the coil C17 is then pulled toward the non-connection position, placed on the corresponding rib 36, and wound to form the coil C18.

The wire 90 wound in the reversed direction to form the coil C18 is then pulled toward the non-connection position, placed on the corresponding rib 36, and wound to form the coil C24. The wire 90 wound in the forward direction to form the coil C24 is then pulled toward the non-connection position, placed on the corresponding rib 36, and wound to form the coil C23. The wire 90 wound in the reversed direction to form the coil C23 is then pulled toward the connection position.

The wire 90 pulled to the connection position is wound to form the coil C13. The wire 90 wound in the forward direction to form the coil C13 is then pulled toward the non-connection position, placed on the corresponding rib 36, and wound to form the coil C14.

The wire 90 wound in the reversed direction to form the coil C14 is then pulled toward the non-connection position, placed on the corresponding rib 36, and wound to form the coil C20. The wire 90 wound in the forward direction to form the coil C20 is then pulled toward the non-connection position, placed on the corresponding rib 36, and wound to form the coil C19. The wire 90 wound in the reversed direction to form the coil C19 is then pulled toward the connection position.

The wire 90 pulled to the connection position is wound to form the coil C9. The wire 90 wound in the forward direction to form the coil C9 is then pulled toward the non-connection position, placed on the corresponding rib 36, and wound to form the coil C10.

The wire 90 wound in the reversed direction to form the coil C10 is then pulled toward the non-connection position, placed on the corresponding rib 36, and wound to form the coil C16. The wire 90 wound in the forward direction to form the coil C16 is then pulled toward the non-connection position, placed on the corresponding rib 36, and wound to form the coil C15. The wire 90 wound in the reversed direction to form the coil C15 is then pulled toward the connection position.

The wire 90 pulled to the connection position is wound to form the coil C5. The wire 90 wound in the forward direction to form the coil C5 is then pulled toward the non-connection position, placed on the corresponding rib 36, and wound to form the coil C6.

The wire 90 wound in the reversed direction to form the coil C6 is then pulled toward the non-connection position, placed on the corresponding rib 36, and wound to form the coil C12. The wire 90 wound in the forward direction to form the coil C12 is then pulled toward the non-connection position, placed on the corresponding rib 36, and wound to form the coil C11. The wire 90 wound in the reversed direction to form the coil C11 is then pulled toward the connection position.

This completes the 24 coils 33.

The wire 90 located on the connection position includes a portion between the winding start S and the coil C1 and a portion between the coil C11 and the winding end E. These portions of the wire 90 are each connected to the fusing terminal 92U.

The wire 90 located on the connection position includes a portion between the coil C7 and the coil C21 and a portion between the coil C19 and the coil C9. These portions of the wire 90 are each connected to the fusing terminal 92V.

The wire 90 located on the connection position includes a portion between the coil C3 and the coil C17 and a portion between the coil C15 and the coil C5. These portions of the wire 90 are each connected to the fusing terminal 92W.

As shown in FIGS. 25 and 26, the wire 90 includes multiple portions located on the non-connection position or the lower end cover 32B. The portions of the wire 90 located on the non-connection position include a wire 901 connecting the coil C2 to the coil C8, a wire 902 connecting the coil C6 to the coil C12, a wire 903 connecting the coil C9 to the coil C10, a wire 904 connecting the coil C10 to the coil C16, a wire 905 connecting the coil C14 to the coil C20, a wire 906 connecting the coil C18 to the coil C24, and a wire 907 connecting the coil C22 to the coil C4.

The wire 90 includes overlapping portions on the lower end cover 32B at the non-connection position. With the protrusions 37, a pair of overlapping portions of the wire 90 are less likely to come in contact with each other. The protrusions 37 in the embodiment include a protrusion 371, a protrusion 372, a protrusion 373, a protrusion 374, a protrusion 375, a protrusion 376, and a protrusion 377.

As shown in FIGS. 25 and 26, the wire 902 overlaps at least a part of the wire 901. The protrusion 371 supports the wire 902. Thus, the wire 901 is less likely to come in contact with the wire 902. The wire 902 on the protrusion 371 is lifted above the wire 901. Thus, the wire 901 is less likely to come in contact with the wire 902.

The wire 902 overlaps at least a part of the wire 903. The protrusion 372 supports the wire 902. Thus, the wire 903 is less likely to come in contact with the wire 902. The wire 902 on the protrusion 372 is lifted above the wire 903. Thus, the wire 903 is less likely to come in contact with the wire 902.

The wire 902 overlaps at least a part of the wire 904. The protrusion 373 supports the wire 902. Thus, the wire 904 is less likely to come in contact with the wire 902. The wire 902 on the protrusion 373 is lifted above the wire 904. Thus, the wire 904 is less likely to come in contact with the wire 902.

The wire 904 overlaps at least a part of the wire 905. The protrusion 374 supports the wire 904. Thus, the wire 905 is less likely to come in contact with the wire 904. The wire 904 on the protrusion 374 is lifted above the wire 905. Thus, the wire 905 is less likely to come in contact with the wire 904.

The wire 905 overlaps at least a part of the wire 906. The protrusion 375 supports the wire 905. Thus, the wire 906 is less likely to come in contact with the wire 905. The wire 905 on the protrusion 375 is lifted above the wire 906. Thus, the wire 906 is less likely to come in contact with the wire 905.

The wire 906 overlaps at least a part of the wire 907. The protrusion 376 supports the wire 906. Thus, the wire 907 is less likely to come in contact with the wire 906. The wire 906 on the protrusion 376 is lifted above the wire 907. Thus, the wire 907 is less likely to come in contact with the wire 906.

The wire 907 overlaps at least a part of the wire 901. The protrusion 377 supports the wire 907. Thus, the wire 901 is less likely to come in contact with the wire 907. The wire 907 on the protrusion 377 is lifted above the wire 901. Thus, the wire 901 is less likely to come in contact with the wire 907.

Controller

Figure 27:
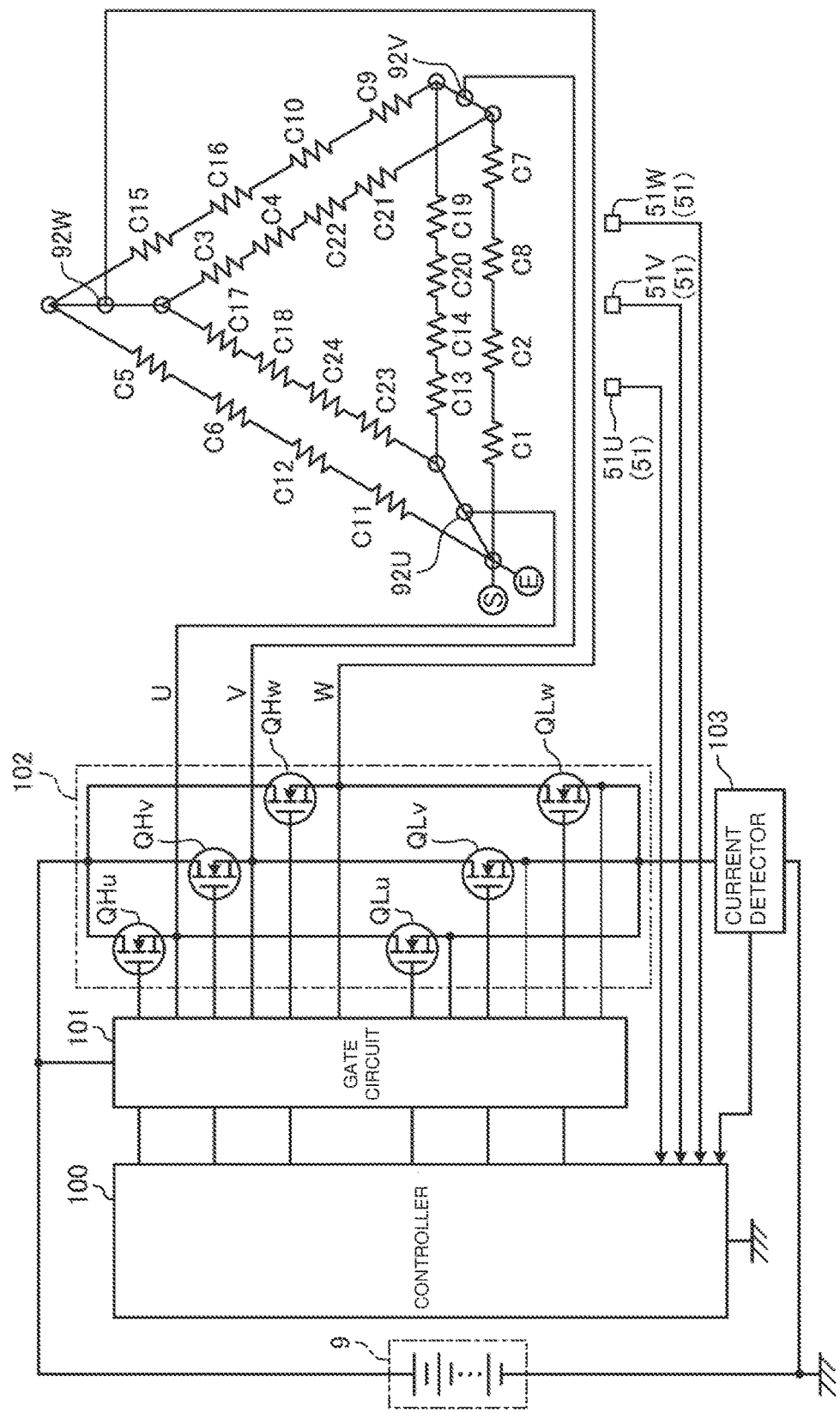
FIG. 27 is a schematic diagram of the electric work machine according to the embodiment.

FIG. 27 is a schematic diagram of the electric work machine 1 according to the embodiment. As shown in FIG. 27, the coils 33 are delta-connected. The coils C1, C2, C8, C7, C13, C14, C20, and C19 are assigned to the U- (UV-) phase. The coils C9, C10, C16, C15, C21, C22, C4, and C3 are assigned to the V- (VW-) phase. The coils C5, C6, C12, C11, C17, C18, C24, and C23 are assigned to the W- (WU-) phase.

The coils C1, C2, C8, and C7 are connected in series. The coils C13, C14, C20, and C19 are connected in series. The coils C1, C2, C8, and C7 are connected to the coils C13, C14, C20, and C19 in parallel.

The coils C9, C10, C16, and C15 are connected in series. The coils C21, C22, C4, and C3 are connected in series. The coils C9, C10, C16, and C15 are connected to the coils C21, C22, C4, and C3 in parallel.

The coils C5, C6, C12, and C11 are connected in series. The coils C17, C18, C24, and C23 are connected in series. The coils C5, C6, C12, and C11 are connected to the coils C17, C18, C24, and C23 in parallel.

In other words, the 24 coils 33 are arranged with two strings of coils 33 connected in parallel, each string including four coils 33 connected in series. The strings are delta-connected.

The sensor board 50 includes three magnetic sensors 51. The magnetic sensors 51 include a magnetic sensor 51U corresponding to the U- (UV-) phase, a magnetic sensor 51V corresponding to the V- (VW-) phase, and a magnetic sensor 51W corresponding to the W- (WU-) phase.

The electric work machine 1 includes a controller 100, a gate circuit 101, an inverter 102, and a current detector 103.

The controller 100 includes a circuit board on which multiple electronic components are mounted. Examples of the electronic components mountable on the circuit board include a processor such as a central processing unit (CPU), a nonvolatile memory such as a read-only memory (ROM) or a storage device, and a volatile memory such as a random-access memory (RAM).

The inverter 102 supplies a driving current to the coils 33 in accordance with the power supplied from the battery pack 9. The inverter 102 includes six switching elements QHu, QHv, QHw, QLu, QLv, and QLw. Each of the switching elements QHu, QHv, QHw, QLu, QLv, and QLw includes a field-effect transistor (FET).

The switching element QHu is located between the fusing terminal 92U and the power line connected to the positive terminal of the battery pack 9. The switching element QHv is located between the fusing terminal 92V and the power line connected to the positive terminal of the battery pack 9. The switching element QHw is located between the fusing terminal 92W and the power line connected to the positive terminal of the battery pack 9.

Turning on the switching element QHu electrically connects the fusing terminal 92U and the power line. Turning on the switching element QHv electrically connects the fusing terminal 92V and the power line. Turning on the switching element QHw electrically connects the fusing terminal 92W and the power line.

The switching element QLu is located between the fusing terminal 92U and the ground line connected to the negative terminal of the battery pack 9. The switching element QLv is located between the fusing terminal 92V and the ground line connected to the negative terminal of the battery pack 9. The switching element QLw is located between the fusing terminal 92W and the ground line connected to the negative terminal of the battery pack 9. Turning on the switching element QLu electrically connects the fusing terminal 92U and the ground line. Turning on the switching element QLv electrically connects the fusing terminal 92V and the ground line. Turning on the switching element QLw electrically connects the fusing terminal 92W and the ground line.

The gate circuit 101 drives the switching elements QHu, QHv, QHw, QLu, QLv, and QLw. The controller 100 outputs control signals to the gate circuit 101 to drive the switching elements QHu, QHv, QHw, QLu, QLv, and QLw in the inverter 102.

The current detector 103 is located on a current path from the inverter 102 to the negative terminal of the battery pack 9. The current detector 103 outputs a signal with a voltage corresponding to the current flowing through the current path. The controller 100 detects the driving current flowing through the coils 33 in response to output signals from the current detector 103.

FIG. 28 is a table showing driving patterns for the switching elements QHu, QHv, QHw, QLu, QLv, and QLw in the embodiment. As shown in FIG. 28, the switching elements QHu, QHv, QHw, QLu, QLv, and QLw are driven in six driving patterns Dp1, Dp2, Dp3, Dp4, Dp5, and Dp6.

In the driving pattern Dp1, the switching elements QHv and QLu are turned on. Thus, the driving current flows through each of the coils 33 assigned to the UV-phase from the fusing terminal 92V to the fusing terminal 92U.

In the driving pattern Dp2, the switching elements QHw and QLu are turned on. Thus, the driving current flows through each of the coils 33 assigned to the WU-phase from the fusing terminal 92W to the fusing terminal 92U.

In the driving pattern Dp3, the switching elements QHw and QLv are turned on. Thus, the driving current flows through each of the coils 33 assigned to the VW-phase from the fusing terminal 92W to the fusing terminal 92V.

In the driving pattern Dp4, the switching elements QHu and QLv are turned on. Thus, the driving current flows through each of the coils 33 assigned to the UV-phase from the fusing terminal 92U to the fusing terminal 92V.

In the driving pattern Dp5, the switching elements QHu and QLw are turned on. Thus, the driving current flows through each of the coils 33 assigned to the WU-phase from the fusing terminal 92U to the fusing terminal 92W.

In the driving pattern Dp6, the switching elements QHv and QLw are turned on. Thus, the driving current flows through each of the coils 33 assigned to the VW-phase from the fusing terminal 92V to the fusing terminal 92W.

The six driving patterns Dp1 to Dp6 are repeated sequentially to generate a rotating magnetic field in the motor 4, thus rotating the rotor 10.

Method for Assembling Motor

Figure 29:
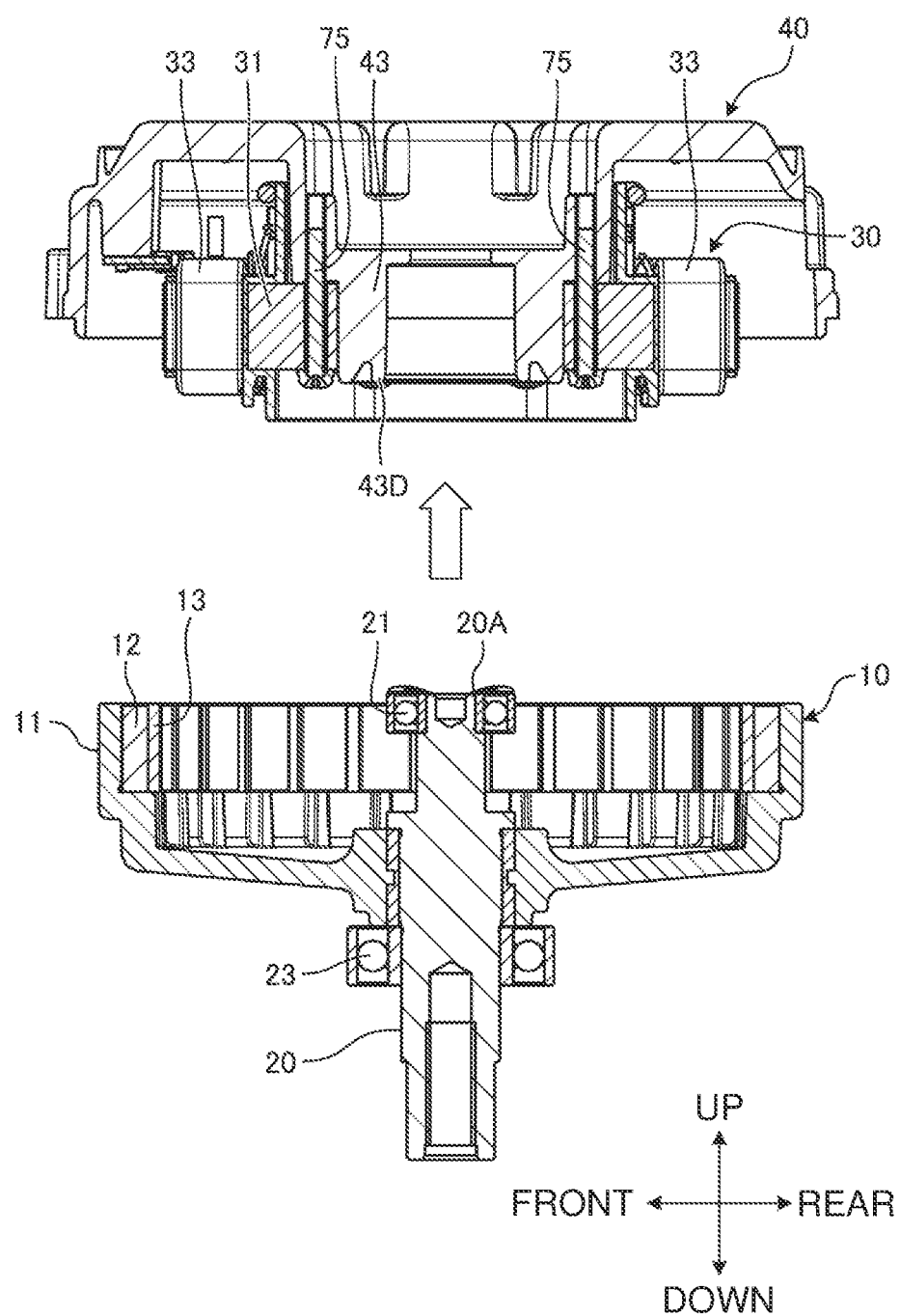
FIG. 29 is a diagram describing a method for assembling the motor in the embodiment.

FIG. 29 is a diagram describing a method for assembling the motor 4 in the embodiment. As shown in FIG. 29, the stator 30 and the stator base 40 are fastened together with the screws 75. The rotor 10 and the rotor shaft 20 are fixed together.

The stator 30 and the stator base 40 are fastened together with the six screws 75. Five or fewer screws 75 may be used to fasten the stator 30 and the stator base 40 together. The stator 30 has a resonant frequency adjustable in accordance with the number of screws 75. This reduces noise (electromagnetic noise) from the motor 4.

The stator 30 and the stator base 40 are fastened together, and the rotor 10 and the rotor shaft 20 are fixed together. Subsequently, the pipe 43 receives the upper portion of the rotor shaft 20. The rotor shaft 20 is placed into the pipe 43 from below the stator 30. The rotor shaft 20 includes the bearing 21 attached on its upper end. The bearing 21 is guided along the pipe 43 as the rotor shaft 20 is placed into the pipe 43.

With the upper end of the rotor shaft 20 vertically aligned with the lower end of the pipe 43, the magnets 13 are located below the stator core 31. In other words, the magnets 13 do not face the stator core 31 before the rotor shaft 20 is placed into the pipe 43. The magnets 13 at least partially face the stator core 31 when the rotor shaft 20 is at least partially placed into the pipe 43. Magnets 13 facing the stator core 31 before the rotor shaft 20 is placed into the pipe 43 may cause the magnets 13 and the stator core 31 to stick together with a magnetic force. This may disable smooth placement of the rotor shaft 20 into the pipe 43.

In the embodiment, the pipe 43, the stator core 31, the rotor shaft 20, and the magnets 13 are located at predetermined positions relative to one another to prevent the magnets 13 from facing the stator core 31 before the rotor shaft 20 is placed into the pipe 43. The magnets 13 at least partially face the stator core 31 when the rotor shaft 20 is at least partially placed into the pipe 43. This prevents the magnets 13 and the stator core 31 from sticking together. Thus, the rotor shaft 20 can be smoothly placed into the pipe 43.

As described above, the electric work machine 1 according to the embodiment includes the stator 30, the rotor 10, and the cutting blade 5 as an output unit drivable by the rotor 10. The stator 30 includes the stator core 31 including the cylindrical yoke 31A and the multiple teeth 31B protruding radially outward from the yoke 31A, the insulator 32 fixed to the stator core 31, and the coils 33 each being wound around the corresponding tooth 31B of the multiple teeth 31B with the insulator 32 in between. The rotor 10 is rotatable about the rotation axis AX. The rotor 10 includes the rotor core 12 located outside the periphery of the stator 30, and the magnets 13 fixed to the rotor core 12. The insulator 32 includes the lower end cover 32B that is a first cover covering the lower end face or a first end face of the yoke 31A in one axial direction, and the ribs 36 located on the lower end cover 32B and supporting the wire 90 connecting the multiple coils 33.

This structure allows the wire 90, which is a connecting wire that connects the multiple coils 33, to be supported by the ribs 36. The wire 90 is thus appropriately wound around the teeth 31B. The coils 33 are thus formed in a reliable manner.

The ribs 36 in the embodiment support the wire 90 extending from the lower end cover 32B and located between the teeth 31B adjacent to each other.

The wire 90 is placed on the teeth 31B through the lower end cover 32B, with reduced unintended bending of the wire 90.

The ribs 36 in the embodiment protrude downward, or in the first axial direction, from the lower end cover 32B. The wire 90 is placed on the ribs 36.

The ribs 36 protruding from the lower end cover 32B securely hold the wire 90.

The insulator 32 in the embodiment includes the multiple ribs 36 located circumferentially at intervals.

The multiple portions of the wire 90, which are connecting wires, are thus supported by the corresponding ribs 36.

The ribs 36 in the embodiment have the same height.

The multiple portions of the wire 90, which are the connecting wires, are thus supported by the ribs 36 under the same condition.

The number of ribs 36 is less than the number of coils 33.

This reduces the likelihood of the insulator 32 becoming heavier or being upsized. In addition, no excessive ribs 36 are used. The wire 90 is thus appropriately placed on the lower end cover 32B.

In the embodiment, the first portion of the wire 90 located on the lower end cover 32B connects the first coil 33 and the second coil 33. The second portion of the wire 90 located on the lower end cover 32B connects the third coil 33 and the fourth coil 33. The second portion of the wire 90 at least partially overlaps the first portion of the wire 90. The insulator 32 includes the protrusion 37 located on the lower end cover 32B and supporting the second portion of the wire 90.

The protrusion 37 thus reduces a contact between the first portion of the wire 90 and the second portion of the wire 90. This also reduces wear of the first portion and the second portion of the wire 90.

The protrusions 37 in the embodiment have a shorter height than the ribs 36.

The protrusions 37 are not excessively high, allowing the wire 90 to be appropriately placed on the lower end cover 32B.

The number of protrusions 37 is less than the number of ribs 36.

This reduces the likelihood of the insulator 32 becoming heavier or being upsized. In addition, no excessive protrusions 37 are used. The wire 90 is thus appropriately placed on the lower end cover 32B.

The protrusion 37 in the embodiment reduces a contact between the first portion of the wire 90 and the second portion of the wire 90.

This reduces wear of the first portion and the second portion of the wire 90. This reduces degradation of the first portion and the second portion of the wire 90.

The protrusions 37 in the embodiment each have the support surface 37A facing downward, or in one axial direction (first axial direction). The second portion of the wire 90 is at least partially located on the support surface 37A of the corresponding protrusion 37.

The second portion of the wire 90 is thus supported on the support surface 37A of the corresponding protrusion 37. This reduces a contact between the first portion of the wire 90 and the second portion of the wire 90.

The number of protrusions is less than the number of coils.

This reduces the likelihood of the insulator 32 becoming heavier or being upsized. In addition, no excessive protrusions 37 are used. The wire 90 is thus appropriately placed on the lower end cover 32B.

The electric work machine 1 according to the embodiment includes the power lines 91 that feed drive currents to the coils 33. The insulator 32 includes the upper end cover 32A that is a second cover covering the upper end face or a second end face of the yoke 31A in the other axial direction (second axial direction), the upper peripheral wall 34 that is a peripheral wall surrounding the rotation axis AX and protruding upward or in the other axial direction (second axial direction) from the upper end cover 32A, and the retainers 38 located on the upper peripheral wall 34 and holding the power lines 91.

The power lines 91 are thus held on the upper peripheral wall 34 with the retainers 38.

The retainers 38 in the embodiment each include a hook located on the outer circumferential surface of the upper peripheral wall 34.

The power lines 91 simply placed on the retainers 38, which are the hooks, are thus secured to the upper peripheral wall 34.

Each power line 91 is at least partially supported on the outer circumferential surface of the upper peripheral wall 34.

This structure reduces interference between, for example, the power lines 91 and the coils 33.

The electric work machine 1 according to the embodiment includes fusing terminals 92 connecting the multiple portions of the wire 90 each protruding from the corresponding coil 33. The upper peripheral wall 34 includes the receptacles 39 receiving the fusing terminals 92.

The fusing terminals 92 simply received in the corresponding receptacles 39 are thus secured to the upper peripheral wall 34.

The fusing terminals 92 in the embodiment are placed in the corresponding receptacles 39 receiving the multiple portions of the wire 90.

This structure allows the fusing terminals 92 to be placed in the corresponding receptacles 39 after the portions of the wire 90 are placed in the receptacles 39. The fusing terminals 92 and the portions of the wire 90 are thus connected smoothly.

In the embodiment, the stator core 31 and the insulator 32 are integral with each other.

The insulator 32 is thus securely fixed to the stator core 31.

Other Embodiments

Figure 30:
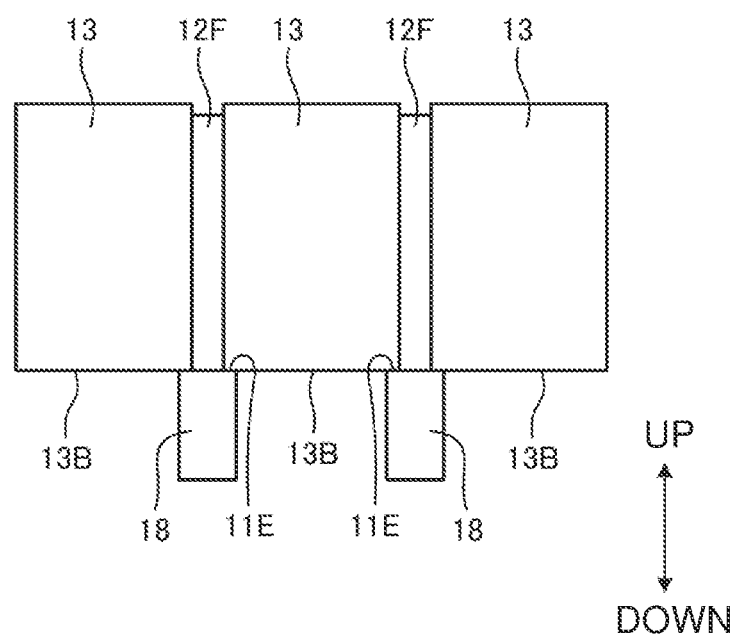
FIG. 30 is a partial schematic diagram of a rotor in another embodiment.

FIG. 30 is a partial schematic diagram of a rotor 10 in another embodiment. In the above embodiments, the magnet support surface 11E supports the middle of the lower end face 13B of each magnet 13. As shown in FIG. 30, the magnet support surface 11E may support a part of the lower end face 13B of a first magnet 13, and a part of the lower end face 13B of a second magnet 13 adjacent to the first magnet 13. In other words, each rib 18 with the magnet support surface 11E may be located circumferentially aligned with the boundary between two magnets 13 adjacent to each other. As shown in FIG. 30, one magnet 13 is supported by two ribs 18.

Figure 31:
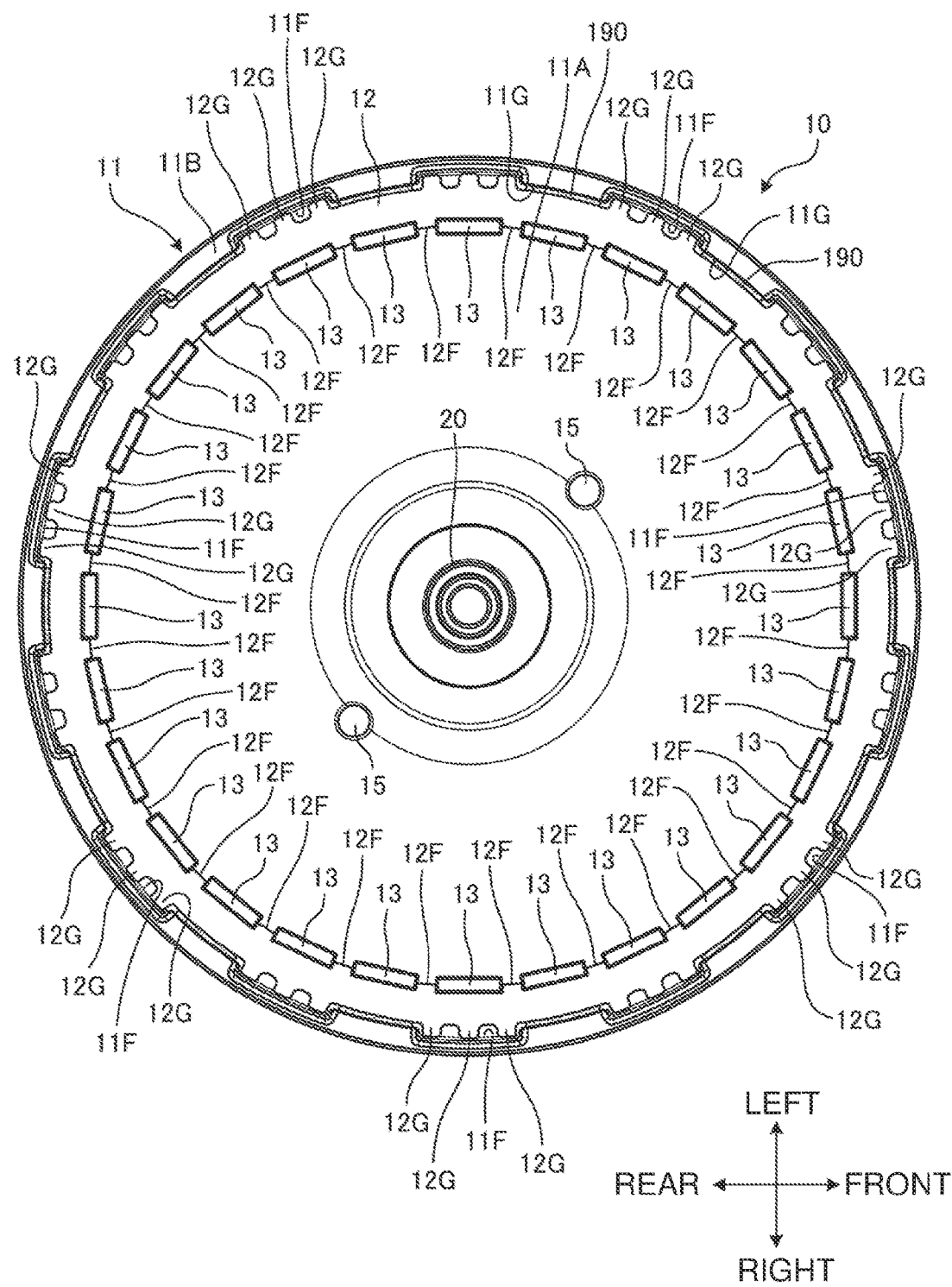
FIG. 31 is a top view of the rotor in the other embodiment.
Figure 32:
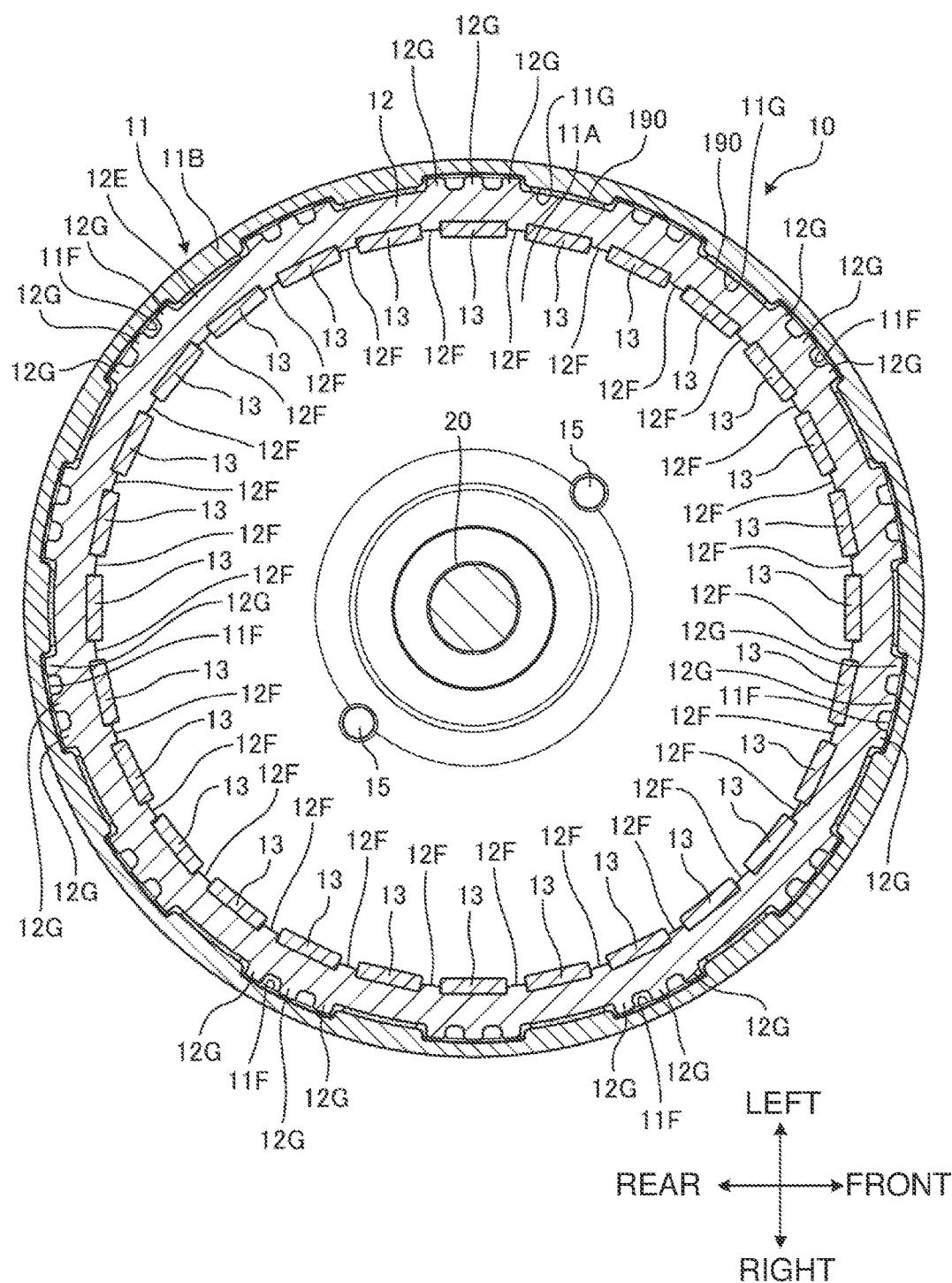
FIG. 32 is a cross-sectional view of the rotor in the other embodiment.

FIG. 31 is a top view of the rotor 10 in the other embodiment. FIG. 32 is a cross-sectional view of the rotor 10 in the other embodiment. In the above embodiment, the rotor core 12 and the rotor cup 11 are fixed together with the adhesive layers 19 between the outer protrusions 12G adjacent to each other. As shown in FIGS. 31 and 32, the rotor core 12 and the rotor cup 11 may be fixed together with anaerobic adhesive layers 190. Each anaerobic adhesive layer 190 is located on the boundary between the inner surface of a protrusion 11G on the rotor cup 11 and the outer surface of the rotor core 12. The protrusion 11G is located between the recesses 11F that are circumferentially adjacent to each other. Each anaerobic adhesive layer 190 is formed with an anaerobic adhesive applied on either the inner surface of the protrusion 11G or the outer surface of the rotor core 12, or both.

In the above embodiments, the multiple ribs 36 have the same height. The ribs 36 may have different heights.

In the above embodiments, the electric work machine 1 is a lawn mower, which is an example of outdoor power equipment. Examples of the outdoor power equipment are not limited to lawn mowers. Examples of the outdoor power equipment include a hedge trimmer, a chain saw, a mower, and a blower. The electric work machine 1 may be a power tool. Examples of the power tool include a driver drill, a vibration driver drill, an angle drill, an impact driver, a grinder, a hammer, a hammer drill, a circular saw, and a reciprocating saw.

In the above embodiments, the electric work machine is powered by the battery pack attached to the battery mount. In some embodiments, the electric work machine may use utility power (alternating-current power supply).

REFERENCE SIGNS LIST 1 electric work machine
2 housing
3 wheel
4 motor
5 cutting blade
6 grass box
7 handle
8 battery mount
9 battery pack
10 rotor
11 rotor cup
11A plate
11B yoke
11C opening
11D core support surface
11E magnet support surface
11F recess
11G protrusion
12 rotor core
12A upper end face
12B lower end face
12C inner circumferential surface
12D outer circumferential surface
12E ring
12F inner protrusion
12G outer protrusion
13 magnet
13A upper end face
13B lower end face
13C inner end face
13D outer end face
14 bush
15 outlet
16 larger-diameter portion
17 smaller-diameter portion
18 rib
18A upper end face
18C inner end face
19 adhesive layer
20 rotor shaft
21 bearing
22 wave washer
23 bearing
30 stator
31 stator core
31A yoke
31B tooth
31C core threaded opening
32 insulator
32A upper end cover
32B lower end cover
32C outer circumference cover
32D tooth cover
32E rib
33 coil
34 upper peripheral wall
35 lower peripheral wall
36 rib
37 protrusion
37A support surface
38 retainer
39 receptacle
39A compartment
39B hook
39C recess
39D lower portion
39E upper portion
39U receptacle
39V receptacle
39W receptacle
40 stator base
41 plate
42 peripheral wall
43 pipe
43A smaller-diameter portion
43B larger-diameter portion
43C base support surface
44 screw boss
44A base threaded hole
45 annular plate
46 screw boss
47 opening
48 shock absorber
49 base
49A base
49B base
49C base
49S support surface
50 sensor board
51 magnetic sensor
51U magnetic sensor
51V magnetic sensor
51W magnetic sensor
52 circuit board
53 resin film
54 support area
54A support area
54B support area
54C support area
60 motor housing
61 plate
62 peripheral wall
63 flange
64 pipe
65 annular plate
66 through-hole
67 screw
68 air passage
70 motor positioner
71 base flat area
72 base curved area
73 stator flat area
74 stator curved area
75 screw
80 board positioner 81 pin
82 screw
83 base pin hole
84 board pin hole
85 base threaded hole
86 board threaded opening
90 wire
91 power line
91U power line
91V power line
91W power line
92 fusing terminal
92A base plate
92B holder plate
92C ring
92D fastener
92E opening
92F lower anchor
92G upper anchor
92U fusing terminal
92V fusing terminal
92W fusing terminal
100 controller
101 gate circuit
102 inverter
103 current detector
190 anaerobic adhesive layer
200 deck
201 through-hole
202 screw
203 baffle
203A opening
204 through-hole
205 screw
371 protrusion
372 protrusion
373 protrusion
374 protrusion
375 protrusion
376 protrusion
377 protrusion
600 screw boss
601 threaded hole
602 screw boss
603 threaded hole
901 wire
902 wire
903 wire
904 wire
905 wire
906 wire
907 wire
AX rotation axis

What is claimed is:

1. An electric work machine, comprising:
a stator including
a stator core including a yoke being cylindrical and a plurality of teeth protruding radially outward from the yoke,
an insulator fixed to the stator core, and
a plurality of coils each being wound around a corresponding tooth of the plurality of teeth with the insulator in between, the insulator including
a first cover covering a first end face of the yoke in a first axial direction, and
a rib on the first cover, the rib supporting a wire connecting the plurality of coils;
a rotor rotatable about a rotation axis, the rotor including
a rotor core located outside a periphery of the stator, and
a magnet fixed to the rotor core; and
an output unit drivable by the rotor, wherein:
the insulator includes a plurality of the ribs located circumferentially at intervals,
the wire includes a first portion of the wire located on the first cover and connecting a first coil and a second coil of the plurality of coils, and a second portion of the wire located on the first cover and connecting a third coil and a fourth coil of the plurality of coils,
the second portion of the wire at least partially overlaps the first portion of the wire, and
the insulator includes a protrusion located on the first cover and supporting the second portion of the wire.

2. The electric work machine according to claim 1, wherein
the rib protrudes from the first cover in the first axial direction, and
the wire is placed on the rib.

3. The electric work machine according to claim 1, wherein
the plurality of ribs have a same height.

4. The electric work machine according to claim 1, wherein
the number of ribs is less than the number of coils.

5. The electric work machine according to claim 1, wherein
the protrusion has a shorter height than the rib.

6. The electric work machine according to claim 1, wherein
the number of protrusions is less than the number of ribs.

7. The electric work machine according to claim 1, wherein
the protrusion reduces a contact between the first portion of the wire and the second portion of the wire.

8. The electric work machine according to claim 1, wherein
the protrusion has a support surface facing in the first axial direction, and
the second portion of the wire is at least partially located on the support surface of the protrusion.

9. The electric work machine according to claim 1, wherein
the number of protrusions is less than the number of coils.

10. The electric work machine according to claim 1, further comprising:
a power line configured to feed a drive current to the plurality of coils,
wherein the insulator includes
a second cover covering a second end face of the yoke in a second axial direction,
a peripheral wall surrounding the rotation axis and protruding from the second cover in the second axial direction, and
a retainer located on the peripheral wall and holding the power line.

11. The electric work machine according to claim 1, wherein
the stator core and the insulator are integral with each other.

12. The electric work machine according to claim 1, wherein
the rib supports the wire extending from the first cover and located between adjacent teeth of the plurality of teeth.

13. The electric work machine according to claim 12, wherein
the rib protrudes from the first cover in the first axial direction, and
the wire is placed on the rib.

14. An electric work machine, comprising:
a stator including
a stator core including a yoke being cylindrical and a plurality of teeth protruding radially outward from the yoke,
an insulator fixed to the stator core, and
a plurality of coils each being wound around a corresponding tooth of the plurality of teeth with the insulator in between, the insulator including
a first cover covering a first end face of the yoke in a first axial direction, and
a rib on the first cover, the rib supporting a wire connecting the plurality of coils;
a rotor rotatable about a rotation axis, the rotor including
a rotor core located outside a periphery of the stator, and
a magnet fixed to the rotor core;
an output unit drivable by the rotor; and
a power line configured to feed a drive current to the plurality of coils,
wherein the insulator includes
a second cover covering a second end face of the yoke in a second axial direction,
a peripheral wall surrounding the rotation axis and protruding from the second cover in the second axial direction,
a retainer located on the peripheral wall and holding the power line, and
wherein the retainer includes a hook on an outer circumferential surface of the peripheral wall.

15. The electric work machine according to claim 14, wherein
the power line is at least partially supported on the outer circumferential surface of the peripheral wall.

16. The electric work machine according to claim 14, further comprising:
a fusing terminal connecting a plurality of portions of the wire each protruding from a corresponding coil of the plurality of coils,
wherein the peripheral wall includes a receptacle receiving the fusing terminal.

17. The electric work machine according to claim 16, wherein
the fusing terminal is placed in the receptacle receiving the plurality of portions of the wire.

* * * * *